(12) United States Patent
Koncz

(10) Patent No.: US 10,479,029 B2
(45) Date of Patent: Nov. 19, 2019

(54) COMPOSITE FORMING APPARATUS

(71) Applicant: The Boeing Company, Chicago, IL (US)

(72) Inventor: Tibor A. Koncz, Monroe, WA (US)

(73) Assignee: The Boeing Company, Chicago, IL (US)

( * ) Notice: Subject to any disclaimer, the term of this patent is extended or adjusted under 35 U.S.C. 154(b) by 801 days.

(21) Appl. No.: 14/599,451

(22) Filed: Jan. 16, 2015

(65) Prior Publication Data

US 2016/0207266 A1   Jul. 21, 2016

(51) Int. Cl.
| | | |
|---|---|---|
| *B29C 70/02* | (2006.01) | |
| *B29C 70/44* | (2006.01) | |
| *B29C 70/54* | (2006.01) | |
| *B29C 33/22* | (2006.01) | |
| *B29L 31/30* | (2006.01) | |

(52) U.S. Cl.
CPC .............. *B29C 70/02* (2013.01); *B29C 70/44* (2013.01); *B29C 70/54* (2013.01); *B29C 33/22* (2013.01); *B29L 2031/3076* (2013.01)

(58) Field of Classification Search
CPC ......... B29C 70/30; B29C 70/34; B29C 70/36; B29C 70/44; B29C 70/541; B29C 70/542; B29C 70/543; B29C 33/0011; B29C 51/145; B29C 51/08; B29C 51/14; B29C 53/02; B29C 53/04; B29B 11/16; B32B 27/12

See application file for complete search history.

(56) References Cited

U.S. PATENT DOCUMENTS

| | | | | |
|---|---|---|---|---|
| 1,872,482 A | * | 8/1932 | Messing ................ | B29C 53/02 156/196 |
| 2,796,634 A | * | 6/1957 | Chellis ................. | B29C 43/146 156/196 |
| 2,797,179 A | * | 6/1957 | Kress ................... | B29C 43/146 156/219 |
| 3,045,287 A | * | 7/1962 | Yost ....................... | B29C 53/02 264/292 |
| 3,115,678 A | * | 12/1963 | Keen .................... | B29C 51/145 264/322 |
| 3,542,616 A | * | 11/1970 | Cain ...................... | A41C 5/005 156/224 |

(Continued)

FOREIGN PATENT DOCUMENTS

| | | |
|---|---|---|
| CN | 103878899 A | 6/2014 |
| DE | 21831 A | 9/1961 |

(Continued)

OTHER PUBLICATIONS

Extended European Search Report, dated Jun. 8, 2016, regarding Application No. EP15193969.1, 8 pages.

(Continued)

*Primary Examiner* — Matthew J Daniels
*Assistant Examiner* — Andrew D Graham
(74) *Attorney, Agent, or Firm* — Yee & Associates, P.C.

(57) ABSTRACT

A system and method for forming a composite structure. The apparatus comprises a base, a plate, a number of movement systems, and a number of sheets. The number of movement systems move one of the base and the plate relative to the other. The number of sheets is connected to the plate.

20 Claims, 18 Drawing Sheets

(56) References Cited

U.S. PATENT DOCUMENTS

| | | | | |
|---|---|---|---|---|
| 3,582,446 A * | | 6/1971 | Stolki | B29C 37/0085 428/136 |
| 3,746,589 A * | | 7/1973 | Reinke | B29C 43/32 156/73.1 |
| 4,071,598 A * | | 1/1978 | Meadors | B29C 51/006 264/163 |
| 4,174,988 A * | | 11/1979 | Moore | B29C 53/02 156/213 |
| 4,194,938 A * | | 3/1980 | Figge | B29C 51/145 156/212 |
| 4,242,398 A * | | 12/1980 | Segawa | B29C 51/145 181/284 |
| 4,447,282 A * | | 5/1984 | Valerio | B27D 1/08 156/212 |
| 4,740,417 A * | | 4/1988 | Tornero | B29C 51/145 156/222 |
| 4,842,469 A * | | 6/1989 | Schmidt | B05C 5/0212 118/410 |
| 5,037,599 A * | | 8/1991 | Olson | B29C 51/28 264/136 |
| 5,045,261 A * | | 9/1991 | Weeks | B29C 70/345 264/108 |
| 5,071,338 A | | 12/1991 | Dublinski et al. | |
| 5,090,639 A * | | 2/1992 | Miller | B64D 9/00 244/118.1 |
| 5,102,723 A * | | 4/1992 | Pepin | B32B 7/04 244/133 |
| 5,104,700 A * | | 4/1992 | Peterson | F16L 57/04 220/88.1 |
| 5,114,654 A * | | 5/1992 | Hosoi | B29C 51/004 264/313 |
| 5,116,639 A * | | 5/1992 | Kolk | A47B 83/001 156/211 |
| 5,173,314 A * | | 12/1992 | Hosoi | B29C 51/004 100/211 |
| 5,344,602 A * | | 9/1994 | Yencho | B29C 53/04 156/222 |
| 5,378,134 A | | 1/1995 | Blot et al. | |
| 5,427,518 A * | | 6/1995 | Morizot | B29C 31/085 100/211 |
| 5,433,165 A * | | 7/1995 | McGuiness | B29C 70/443 114/357 |
| 5,589,015 A * | | 12/1996 | Fusco | B32B 5/26 156/73.1 |
| 5,759,594 A * | | 6/1998 | Masui | B29C 51/145 156/268 |
| 5,783,132 A * | | 7/1998 | Matsumoto | B29C 70/46 156/222 |
| 5,833,796 A * | | 11/1998 | Matich | A42C 2/00 156/285 |
| 5,876,540 A * | | 3/1999 | Pannell | B29C 65/344 156/91 |
| 5,879,612 A * | | 3/1999 | Zeiter | B29C 51/04 264/292 |
| 5,897,935 A * | | 4/1999 | Ellis | B32B 7/02 24/711.1 |
| 5,908,524 A * | | 6/1999 | Masui | B29C 51/082 156/212 |
| 5,913,996 A * | | 6/1999 | Ikegame | B29C 51/08 156/212 |
| 6,269,671 B1 * | | 8/2001 | Zeiter | B29C 51/08 425/398 |
| 6,311,542 B1 * | | 11/2001 | Sloman | B29C 70/08 156/245 |
| 6,533,980 B1 * | | 3/2003 | van Manen | B26D 7/1818 156/256 |
| 6,630,097 B1 * | | 10/2003 | Maritan | B29C 53/02 264/238 |
| 6,645,333 B2 * | | 11/2003 | Johnson | B29C 70/086 156/92 |
| 6,962,114 B1 * | | 11/2005 | Forbes | B61D 3/08 105/355 |
| 7,374,715 B2 * | | 5/2008 | Husmann | B29C 70/443 264/102 |
| 8,211,268 B1 * | | 7/2012 | Raghavendran | B29C 65/02 156/307.1 |
| 8,840,828 B2 | | 9/2014 | Hallander et al. | |
| 9,409,356 B2 | | 8/2016 | Karb et al. | |
| 9,427,910 B2 * | | 8/2016 | Ando | B29C 63/0073 |
| 9,597,844 B2 * | | 3/2017 | Blot | B29C 70/48 |
| 9,657,762 B2 * | | 5/2017 | Neal | F16B 19/00 |
| 2001/0053394 A1 | | 12/2001 | Oster | B29C 51/087 425/406 |
| 2002/0004707 A1 * | | 1/2002 | Trudeau | B29C 70/543 702/33 |
| 2003/0155685 A1 * | | 8/2003 | Spengler | B29C 43/36 264/250 |
| 2004/0028884 A1 * | | 2/2004 | Woolstencroft | B29C 70/08 428/292.1 |
| 2004/0043196 A1 * | | 3/2004 | Willden | B29C 43/12 428/174 |
| 2005/0161865 A1 * | | 7/2005 | Bristow | B29C 51/004 264/511 |
| 2005/0167034 A1 * | | 8/2005 | Gearhart | B29C 51/16 156/212 |
| 2005/0255770 A1 | | 11/2005 | Crump | |
| 2006/0151085 A1 * | | 7/2006 | Habisreitinger | B29C 63/02 156/54 |
| 2006/0220274 A1 * | | 10/2006 | Dooley | B29C 45/14196 264/259 |
| 2007/0145631 A1 * | | 6/2007 | Salzmann | B29C 51/145 264/171.14 |
| 2008/0115555 A1 * | | 5/2008 | Depase | B29C 70/345 72/343 |
| 2009/0091063 A1 * | | 4/2009 | Petersson | B29C 43/12 264/320 |
| 2009/0123708 A1 * | | 5/2009 | Depase | B29C 70/342 428/178 |
| 2009/0206202 A1 * | | 8/2009 | Bolukbasi | B64C 1/062 244/121 |
| 2009/0321978 A1 * | | 12/2009 | Kurtz | B29C 33/68 264/101 |
| 2010/0124659 A1 * | | 5/2010 | Nelson | B29C 35/0266 428/411.1 |
| 2010/0200695 A1 * | | 8/2010 | Tsakiris | B64C 1/20 244/118.1 |
| 2011/0017386 A1 * | | 1/2011 | Bouvet | B29C 33/10 156/228 |
| 2011/0068225 A1 * | | 3/2011 | Curry | B64C 1/20 244/118.1 |
| 2011/0127698 A1 * | | 6/2011 | Alenby | B29C 70/44 264/510 |
| 2011/0240213 A1 * | | 10/2011 | Barlag | B29C 70/388 156/243 |
| 2011/0287213 A1 * | | 11/2011 | Suzuki | B29C 70/44 428/113 |
| 2012/0315429 A1 * | | 12/2012 | Stamp | B29C 70/028 428/72 |
| 2012/0328847 A1 * | | 12/2012 | Buska | B29C 49/0047 428/178 |
| 2013/0064998 A1 * | | 3/2013 | Wnek | B21D 22/26 428/34.1 |
| 2013/0129968 A1 * | | 5/2013 | Weidmann | B29C 70/025 428/113 |
| 2013/0241100 A1 * | | 9/2013 | Lownsdale | B29C 70/12 264/101 |
| 2013/0266431 A1 * | | 10/2013 | Moram | B29C 53/04 415/182.1 |
| 2013/0340601 A1 * | | 12/2013 | Townsend | B64C 1/20 89/36.02 |
| 2014/0044914 A1 * | | 2/2014 | Kurtz | B32B 3/28 428/74 |
| 2014/0087178 A1 * | | 3/2014 | Arai | B32B 5/04 428/327 |
| 2014/0110875 A1 * | | 4/2014 | Khan | B29C 70/54 264/40.5 |
| 2014/0234603 A1 * | | 8/2014 | Werner | B32B 5/12 428/218 |

(56) References Cited

U.S. PATENT DOCUMENTS

| | | | | |
|---|---|---|---|---|
| 2014/0242346 A1* | 8/2014 | Nielsen | B21D 22/203 | |
| | | | 428/174 | |
| 2014/0246810 A1* | 9/2014 | Kato | B29C 33/12 | |
| | | | 264/325 | |
| 2015/0004867 A1* | 1/2015 | Deyts | D04H 3/002 | |
| | | | 442/402 | |
| 2015/0041529 A1* | 2/2015 | Rasanen | B65D 1/26 | |
| | | | 229/407 | |
| 2015/0097313 A1* | 4/2015 | Liu | B29C 51/085 | |
| | | | 264/322 | |
| 2015/0165721 A1* | 6/2015 | Yasaee | B32B 5/00 | |
| | | | 428/592 | |
| 2015/0167208 A1* | 6/2015 | Bischoff | B29C 70/22 | |
| | | | 442/59 | |
| 2015/0231835 A1* | 8/2015 | Pridie | B29C 70/38 | |
| | | | 264/40.1 | |
| 2016/0046064 A1* | 2/2016 | Sartor | B29C 70/46 | |
| | | | 264/132 | |
| 2016/0121589 A1* | 5/2016 | Pham | B32B 37/1018 | |
| | | | 156/285 | |
| 2017/0001383 A1* | 1/2017 | Vaudour | B29C 70/345 | |
| 2017/0233281 A1* | 8/2017 | Banham | B29D 11/00596 | |
| | | | 156/242 | |

FOREIGN PATENT DOCUMENTS

| | | |
|---|---|---|
| DE | 1635404 A1 | 4/1971 |
| DE | 69309185 T2 | 7/1997 |
| EP | 2578384 A2 | 4/2013 |

OTHER PUBLICATIONS

China National Intellectual Property Administration First Notification of Office Action and English translation, dated Nov. 15, 2018, regarding Application No. 201510849729.0, 11 pages.

China National Intellectual Property Administration Second Notification of Office Action with English Translation, dated Apr. 15, 2019, regarding Application No. 201510849729.0, 12 pages.

* cited by examiner

COMPOSITE FORMING APPARATUS

BACKGROUND INFORMATION

1. Field:

The present disclosure generally relates to composite structures and, in particular, to the fabrication of composite structures. Still more particularly, the present disclosure relates to a method and apparatus for progressively forming composite structures.

2. Background:

Aircraft are being designed and manufactured with greater and greater percentages of composite materials. Composite materials are used in aircraft to decrease the weight of the aircraft. This decreased weight improves performance features such as payload capacities and fuel efficiencies. Further, composite materials may provide longer service life for various components in an aircraft.

Composite materials are tough, lightweight materials created by combining two or more functional components. For example, a composite material may include reinforcing fibers bound in polymer resin matrix. The fibers may be randomly distributed chopped fibers, unidirectional, or may take the form of a woven cloth or fabric.

In thermoset composites, fibers and resins are arranged and cured to form a composite structure. In thermoplastic composites, fibers and resins are heated to provide formability. While formable, the thermoplastic composite may be shaped and then allowed to cool.

To form composite structures with complex shapes, multiple plies of composite material may be placed on top of each other over a tool. The plies of composite material may be formed over the tool including over at least one tool radius. Forming the plies of composite material may form inconsistencies outside of tolerance. When the inconsistencies are outside of tolerance the composite structure may have undesirable quality. When the composite structure has undesirable quality, the composite structure may be reworked or discarded. Reworking a composite structure or discarding a composite structure may increase at least one of manufacturing time or manufacturing cost.

Therefore, it would be desirable to have a method and apparatus that take into account at least some of the issues discussed above, as well as other possible issues. Specifically, one issue is to find a method and apparatus for forming composite materials that may result in a composite structure having a complex shape and a desirable quality. Further, another issue is to find a method and apparatus for forming multiple plies of composite materials over at least one tooling radius.

SUMMARY

An illustrative embodiment of the present disclosure provides an apparatus. The apparatus comprises a base, a plate, a number of movement systems, and a number of sheets. The number of movement systems move one of the base and the plate relative to the other. The number of sheets is connected to the plate.

Another illustrative embodiment of the present disclosure provides an apparatus. The apparatus comprises a base, a plate, a number of movement systems, and a number of sheets. The base may have a number of cavities. The plate may be associated with a cavity of the number of cavities. The number of movement systems may be within the cavity of the number of cavities. The number of sheets may be connected to the plate.

A further illustrative embodiment of the present disclosure provides a method. The method may comprise interleaving a number of composite plies and portions of a number of sheets. The method may also lower a plate connected to the number of sheets.

Another illustrative embodiment of the present disclosure provides a method. The method may comprise placing a first ply onto a base having a number of cavities. The method may also place a portion of a sheet onto the first ply. The method may further place a second ply onto the first ply. The method may further place a drape over the first ply, the second ply, and the first sheet. The method may also draw a vacuum under the drape. The method may further lower a plate connected to the sheet.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
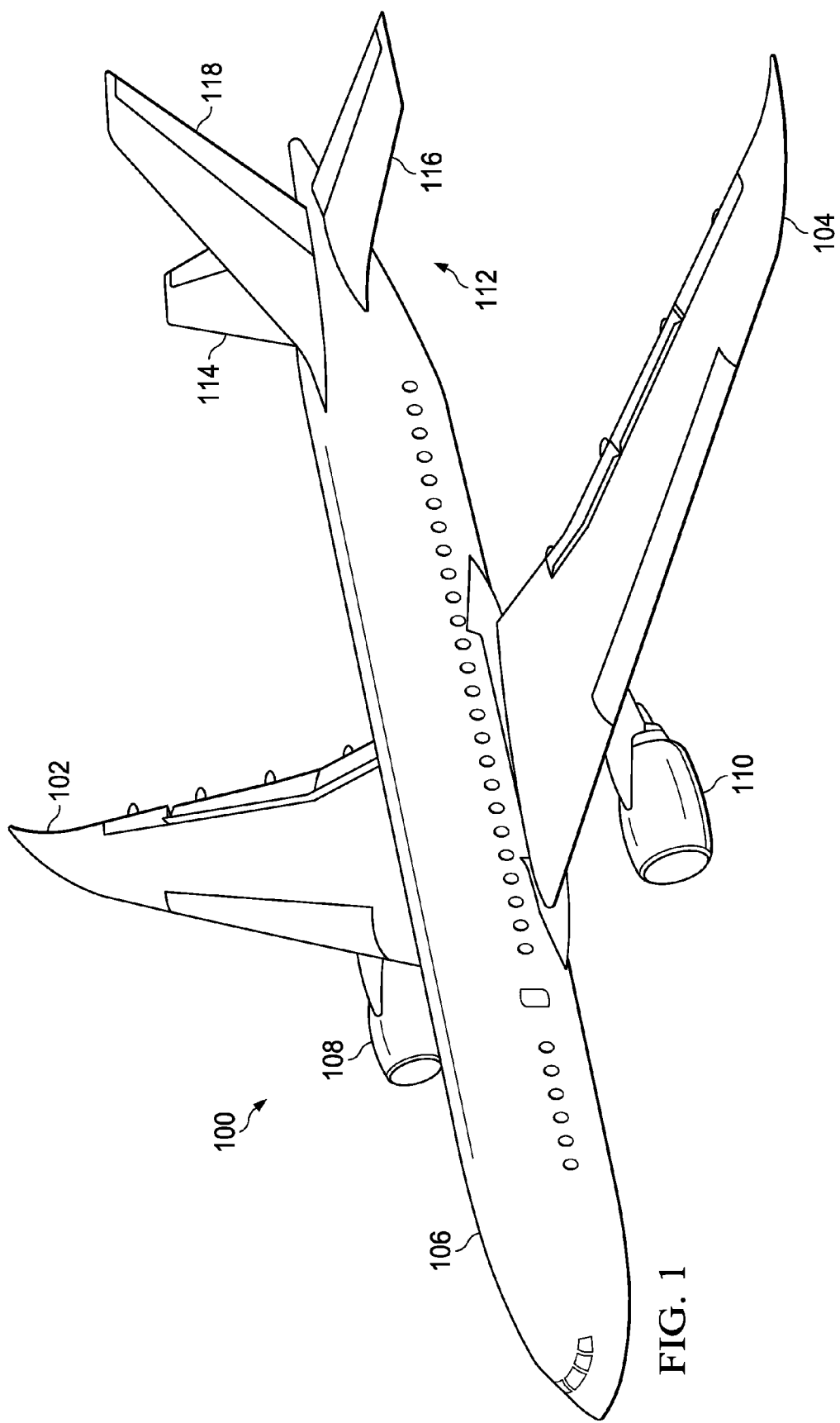
FIG. 1 is an illustration of an aircraft in which an illustrative embodiment may be implemented.

The illustrative embodiments recognize and take into account one or more different considerations. The illustrative embodiments recognize and take into account that a composite structure may be formed from at least one of a thermoplastic material or a thermoset material. The illustrative embodiments recognize and take into account that a first composite structure may be initially formed from a first composite material. Subsequent composite structures having substantially the same shape as the first composite structure may be formed from a different composite material. Thus, the illustrative embodiments recognize and take into account that a tool may desirably be usable with different types of composite materials.

The illustrative embodiments recognize and take into account that it may be desirable to form a substantially flat multiple ply composite material into a complex shape without out of tolerance inconsistencies. The illustrative embodiments recognize and take into account that a substantially flat multiple ply composite material may be formed into a complex shape by forming the plies over a tool radius. The illustrative embodiments recognize and take into account that forming plies of composite material over a tool radius may result in unexpected ply shifts, tearing, splitting, or other undesirable inconsistencies. The illustrative embodiments recognize and take into account that to decrease inconsistencies in a composite structure, plies of composite material may be darted. Darts of a composite material may be portions of the composite material separated by spaces. The darts of the composite material may be folded over a tool radius until they touch. Darting a composite material may add an undesirable amount of manufacturing time. Further, forming a darted composite material may still result in undesirable inconsistencies. Yet further, darting a composite material may still produce a composite structure of undesirable quality.

The illustrative embodiments recognize and take into account that composite plies may stick to each other during forming causing inconsistencies. Sticking may be undesirable when it is desired for the plies to slip relative to each other. Ply slippage may be desired when plies are being formed such that an outer ply may have a longer distance to travel than an inner ply. For example, ply slippage may be desired around a bend or radius. Without ply slippage relative to each other, each ply may move the same distance or length of travel and wrinkles may result. Plies sticking to each other during forming may cause wrinkles, tearing, or other inconsistencies. These inconsistencies may be out of tolerance, which may cause the composite structure to have undesirable quality.

Thus, the illustrative embodiments present methods and an apparatus to form a composite structure. The apparatus comprises a base, a plate, a number of movement systems, and a number of sheets. The base may have a number of cavities. The plate may be associated with a cavity of the number of cavities. The number of movement systems may be within the cavity of the number of cavities. The number of sheets may be connected to the plate.

With reference now to the figures, and in particular, with reference to FIG. 1, an illustration of an aircraft is depicted in which an illustrative embodiment may be implemented. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which a composite structure may be implemented in accordance with an illustrative embodiment. For example, a composite structure may be used in support structures of aircraft 100. For example, a composite structure may be used in at least one of a beam, a rib, or other desirable support structure in at least one of wing 102, wing 104, or body 106. Aircraft 100 may be a physical implementation of aircraft 2100 of FIG. 21.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as a private passenger aircraft, a rotorcraft, and other suitable types of aircraft.

Figure 2:
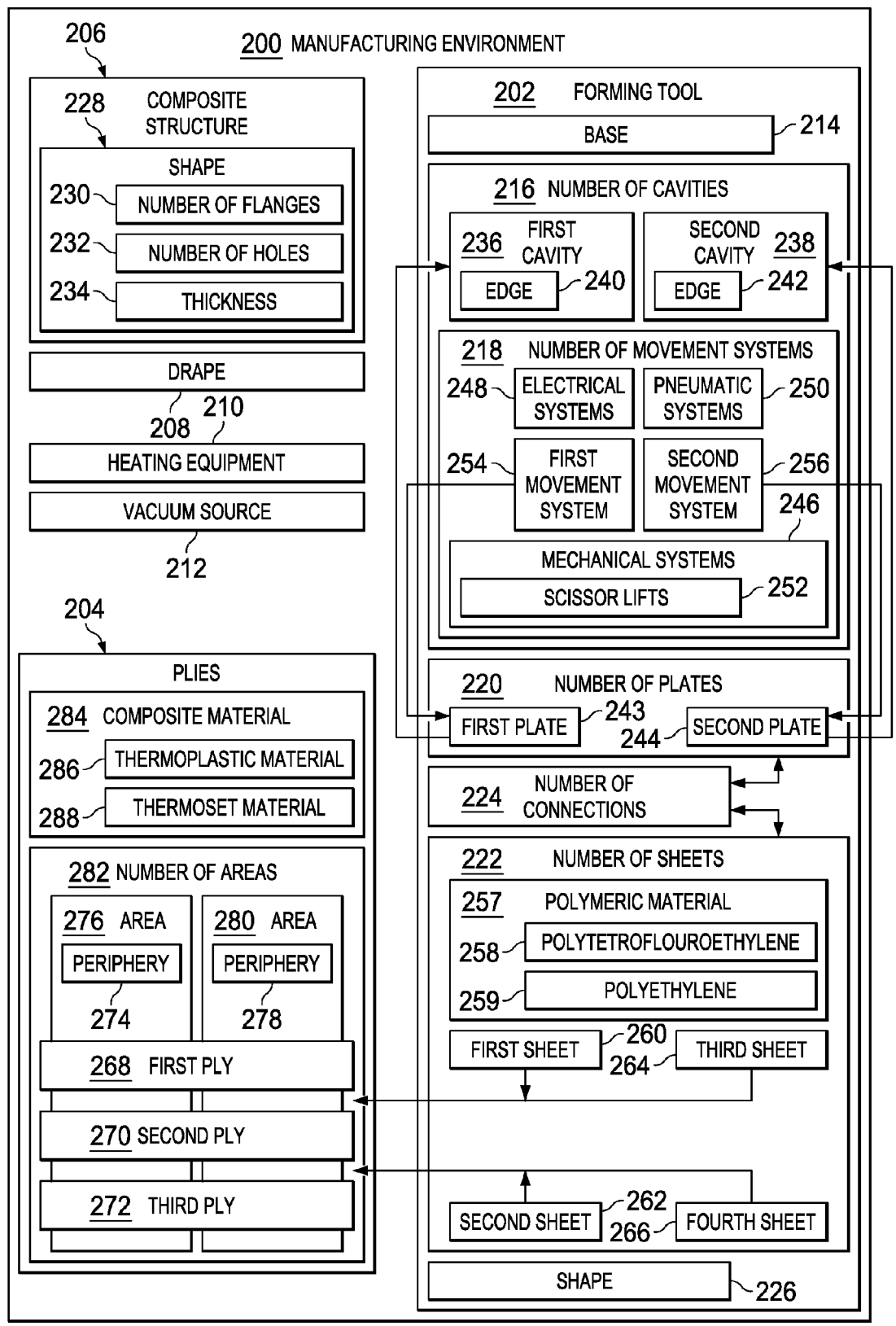
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 200 may be used to form a composite structure. In some illustrative examples, manufacturing environment 200 may be used to form a composite structure of aircraft 100 of FIG. 1. Manufacturing environment 200 may include forming tool 202, plies 204, composite structure 206, drape 208, heating equipment 210, and vacuum source 212.

Forming tool 202 may be used to form plies 204 into composite structure 206. Forming tool 202 may include base 214 having number of cavities 216. Base 214 may be formed of a material selected based on at least one of thermal characteristics, machinability, material cost, material weight, material reactivity, material durability, or other material properties. In some illustrative examples, base 214 may be formed of at least one of a polymeric material, a metal, an alloy, a wood, a ceramic, or other desirable material.

Number of movement systems 218 may be associated with number of plates 220 within number of cavities 216 in base 214. In some illustrative examples, number of plates 220 may be formed of the same material as base 214. In other illustrative examples, number of plates 220 may be formed of a different material than base 214. During forming of plies 204 into composite structure 206, number of plates 220 may lower into cavities 216. As a result, number of plates 220 may also be referred to as a number of depressible plates.

Number of sheets 222 may be connected to number of plates 220 using number of connections 224. Each of number of sheets 222 has substantially the same cross-sectional area as the respective plate of number of plates 220 to which it is connected. If number of sheets 222 is connected to a single plate, each of number of sheets 222 has substantially the same cross-sectional area as the plate.

Forming tool 202 may have shape 226. In some illustrative examples, shape 226 may be a complementary shape to shape 228 of composite structure 206. Complementary shapes may be shapes that fit together. In some illustrative examples, a portion of shape 226 may be substantially the same as shape 228 of composite structure 206.

Shape 228 of composite structure 206 may include at least one of number of flanges 230, number of holes 232, and thickness 234. Shape 228 of composite structure 206 may be described as a complex shape. A complex shape may combine parts or all of simple shapes. Complex shapes in composite materials may include constant curvatures, non-constant curvatures, bends, angles, or other non-planar features such as number of flanges 230. A skin of an aircraft wing may be an example of a complex shape. Number of flanges 230 may be a number of projections from the remainder of composite structure 206. Number of flanges 230 may have an angle relative to the remainder of composite structure 206. The angle may range from greater than about 0 degrees to less than about 180 degrees. In some illustrative examples, number of flanges 230 may be at an angle about 90 degrees from the remainder of composite structure 206. Number of flanges 230 may cause shape 228 of composite structure 206 to be a non-planar shape. Shape 228 of composite structure 206 may be formed into plies 204 by forming plies 204 against base 214.

Number of cavities 216 of forming tool 202 may include first cavity 236 and second cavity 238. First cavity 236 may have edge 240. In some illustrative examples, plies 204 may be formed against at least a portion of edge 240 of first cavity 236. Second cavity 238 may have edge 242. In some illustrative examples, plies 204 may be formed against at least a portion of edge 242 of second cavity 238.

Number of plates 220 may be lowered to form plies 204 against at least a portion of at least one of edge 240 or edge 242. First plate 243 may be associated with first cavity 236. Second plate 244 may be associated with second cavity 238. First plate 243 may be lowered to form plies 204 against at least a portion of edge 240. Second plate 244 may be lowered to form plies 204 against at least a portion of edge 242.

Number of movement systems 218 may be used to lower number of plates 220. Number of movement systems 218 may include at least one of mechanical systems 246, electrical systems 248, or pneumatic systems 250. In some illustrative examples, number of movement system 218 may move number of plates 220 by inflating or deflating using pneumatic systems 250. In some illustrative examples, mechanical systems 246 may be scissor lifts 252. In these illustrative examples, number of movement systems 218 may be a number of scissor lifts.

In some illustrative examples, first movement system 254 and second movement system 256 of number of movement systems 218 may be associated with first plate 243. In some illustrative examples, first movement system 254 of number of movement systems 218 may be associated with first plate 243 while second movement system 256 may be associated with second plate 244.

Number of sheets 222 may be formed of a material selected to allow plies 204 to slip relative to each other. The material of number of sheets 222 may be selected based on at least one of material reactivity, material durability, coefficient of friction, thermal properties, or some other desirable material characteristic. In some illustrative examples, number of sheets 222 may be polymeric material 257. Polymeric material 257 may be polytetrafluoroethylene 258, polyethylene 259, or another desirable polymeric material. Number of sheets 222 may include first sheet 260, second sheet 262, third sheet 264, and fourth sheet 266. First sheet 260 and second sheet 262 may be connected to first plate 243. First sheet 260 and second sheet 262 may be pulled downward into first cavity 236 as first plate 243 is lowered. Third sheet 264 and fourth sheet 266 may be connected to second plate 244. Third sheet 264 and fourth sheet 266 may be pulled downward into second cavity 238 as second plate 244 is lowered.

A portion of first sheet 260 may be positioned between first ply 268 and second ply 270. A portion of second sheet 262 may be positioned between second ply 270 and third ply 272. The portion of first sheet 260 may be positioned between first ply 268 and second ply 270 in periphery 274 of area 276. The portion of second sheet 262 may be positioned between second ply 270 and third ply 272 in periphery 274 of area 276.

A portion of third sheet 264 may be positioned between first ply 268 and second ply 270. The portion of third sheet 264 may be positioned between first ply 268 and second ply 270 in periphery 278 of area 280. A portion of fourth sheet 266 may be positioned between second ply 270 and third ply 272. The portion of fourth sheet 266 may be positioned between second ply 270 and third ply 272 in periphery 278 of area 280.

Number of areas 282 may include area 276 and area 280. Number of areas 282 may be areas which include number of holes 232. Number of areas 282 may include number of flanges 230. Number of flanges 230 may be located in at least one of periphery 274 and periphery 278.

To form composite structure 206 from plies 204, plies 204 may be placed onto base 214. Number of sheets 222 may be interleaved with portions of plies 204. Drape 208 may be placed over plies 204 and number of sheets 222. A vacuum may be pulled under drape 208 using vacuum source 212. As a vacuum is pulled on plies 204 under drape 208, number of plates 220 may be lowered. As number of plates 220 are lowered, first ply 268, second ply 270, and third ply 272 may be progressively formed to edge 240 and edge 242. As number of plates 220 are lowered, first sheet 260, second sheet 262, third sheet 264, and fourth sheet 266 may be progressively removed from between plies 204.

In some illustrative examples, the act of pulling the vacuum under drape 208 moves number of plates 220 downward. In these illustrative examples, the biasing force of number of movement systems 218 towards drape 208 may be less than the downward force produced by pulling a vacuum under drape 208. In some of these illustrative examples, number of movement systems 218 may be scissor lifts 252. Scissor lifts 252 may be biased to an extended position. In some illustrative examples, at least one spring may bias a scissor lift of scissor lifts 252 to an extended position.

Plies 204 may be formed of composite material 284. Plies 204 may also be referred to as composite plies. Composite material 284 may be thermoplastic material 286 or thermoset material 288. When composite material 284 is thermoset material 288, plies 204 may be formed without adding heat. When composite material 284 is thermoplastic material 286, plies 204 may be heated by heating equipment 210. By applying heat to plies 204, thermoplastic material 286 may have increased formability. By applying heat to plies 204, thermoplastic material 286 may be formed against base 214.

This illustration of manufacturing environment 200 is provided for purposes of illustrating one environment in which the different illustrative embodiments may be implemented. The illustration of manufacturing environment 200 in FIG. 2 is not meant to imply architectural limitations as to the manner in which different illustrative embodiments may be implemented. For example, number of movement systems 218 may be associated with forming tool 202. In some illustrative examples, forming tool 202 may move relative to number of plates 220. In some illustrative examples, forming tool 202 may move upward while number of plates 220 remains stationary. In some illustrative examples forming tool 202 may move upward while number of plates 220 moves downward.

As another illustrative example, manufacturing environment 200 may also include a pressure source. For example, a pressure source may apply pressure to drape 208 during forming of composite material 284.

Figure 3:
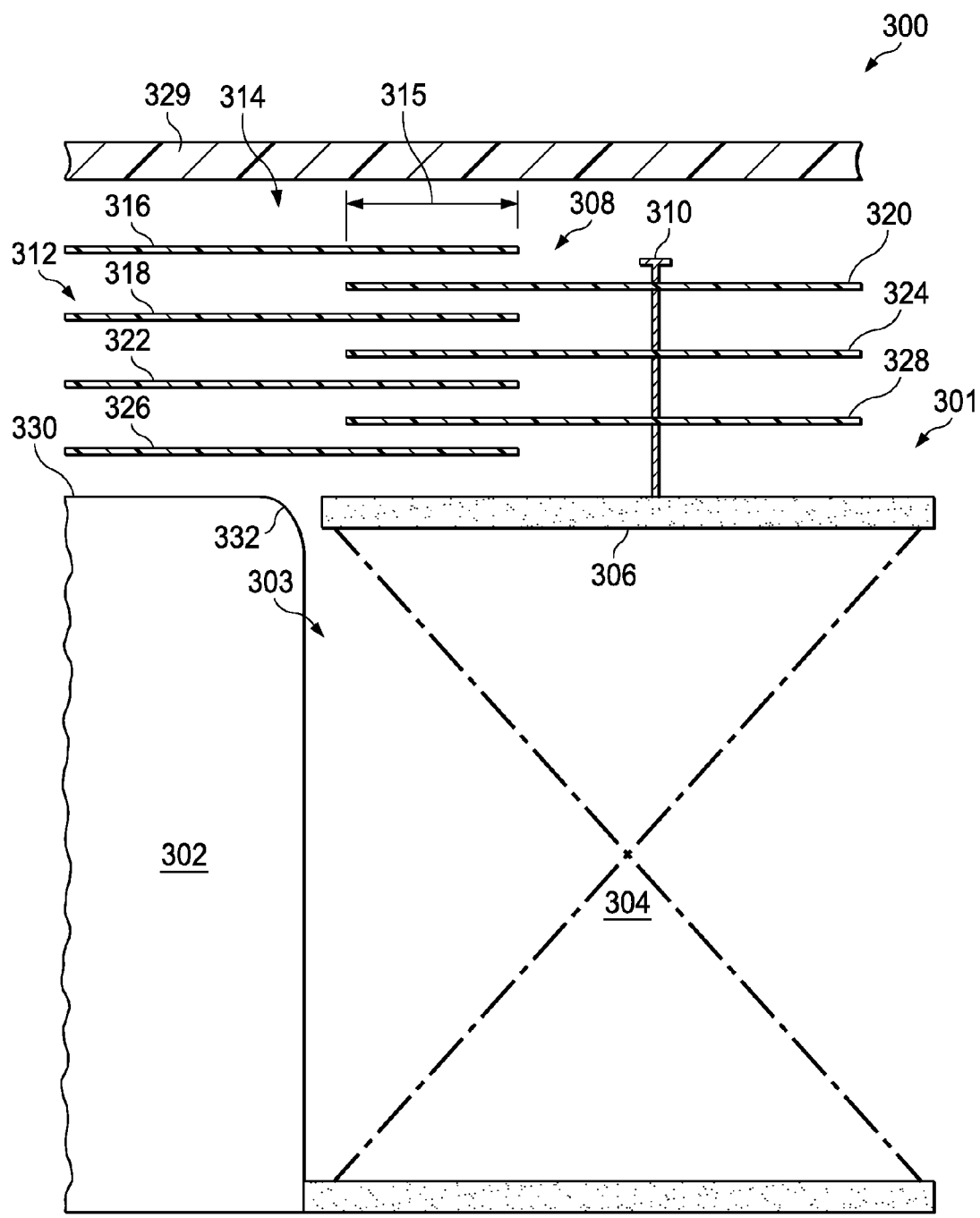
FIG. 3 is an illustration of a cross-sectional view of a forming tool and composite material during forming in accordance with an illustrative embodiment.

Turning now to FIG. 3, an illustration of a cross-sectional view of a forming tool and composite material during forming is depicted in accordance with an illustrative embodiment. View 300 is a cross-sectional view of forming tool 301. Forming tool 301 may be a physical implementation of forming tool 202 in FIG. 2. Forming tool 301 includes base 302, cavity 303, and movement system 304 within cavity. Plate 306 is associated with movement system 304. Plate 306 may also be referred to as a depressible plate. As depicted in view 300, plate 306 may be in an extended position. Number of sheets 308 is connected to plate 306 by connection 310. Number of sheets 308 and plies 312 are interleaved in periphery 314. Number of sheets 308 and plies 312 have overlap 315.

First ply 316 and second ply 318 may move relative to each other in periphery 314. First sheet 320 may allow first ply 316 and second ply 318 to move relative to each other in periphery 314.

Second ply 318 and third ply 322 may move relative to each other in periphery 314. Second sheet 324 may allow second ply 318 and third ply 322 to move relative to each other in periphery 314.

Third ply 322 and fourth ply 326 may move relative to each other in periphery 314. Third sheet 328 may allow third ply 322 and fourth ply 326 to move relative to each other in periphery 314.

Drape 329 may be positioned over plies 312 and number of sheets 308. After positioning drape 329, a vacuum may be pulled under drape 329. In this illustrative example, movement system 304 may hold plate 306 substantially parallel to surface 330 of base 302 of forming tool 301. Plate 306 may be in an extended position. To progressively form plies 312 against edge 332, plate 306 may be moved downward.

Figure 4:
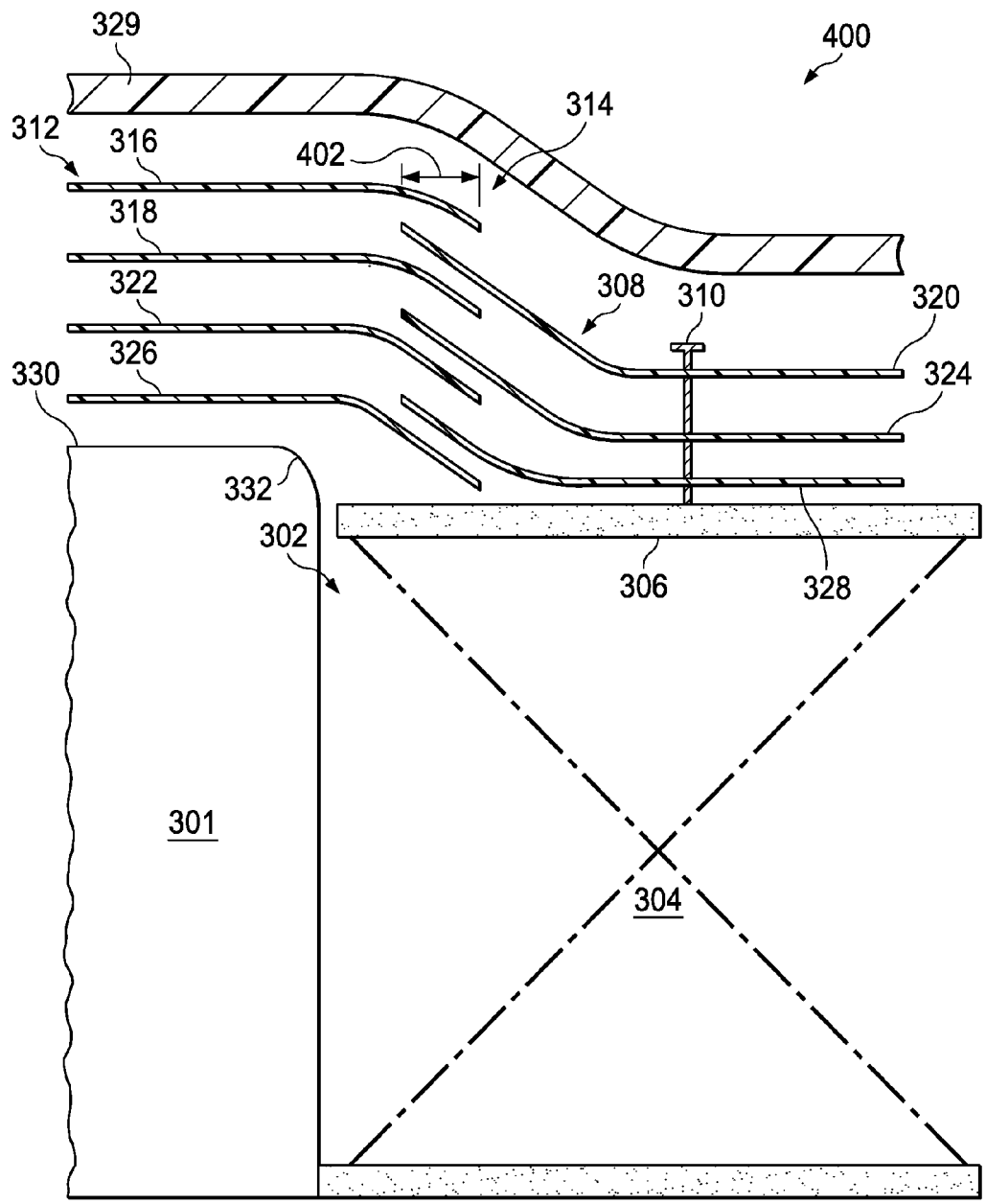
FIG. 4 is an illustration of a cross-sectional view of a forming tool and composite material during forming in accordance with an illustrative embodiment.

Turning now to FIG. 4, an illustration of a cross-sectional view of a forming tool and composite material during forming is depicted in accordance with an illustrative embodiment. In view 400, movement system 304 has lowered plate 306 from the extended position of view 300 in FIG. 3. Lowering plate 306 may progressively form plies 312 against edge 332. Lowering plate 306 may shorten overlap 315 in FIG. 3 to overlap 402. Plate 306 is connected to sheets 308 by connection 310. As plate 306 is lowered, sheets 308 may be pulled from between each of plies 312. As sheets 308 are progressively pulled from between each of plies 312, the portions of plies 312 able to move relative to each other decreases.

Figure 5:
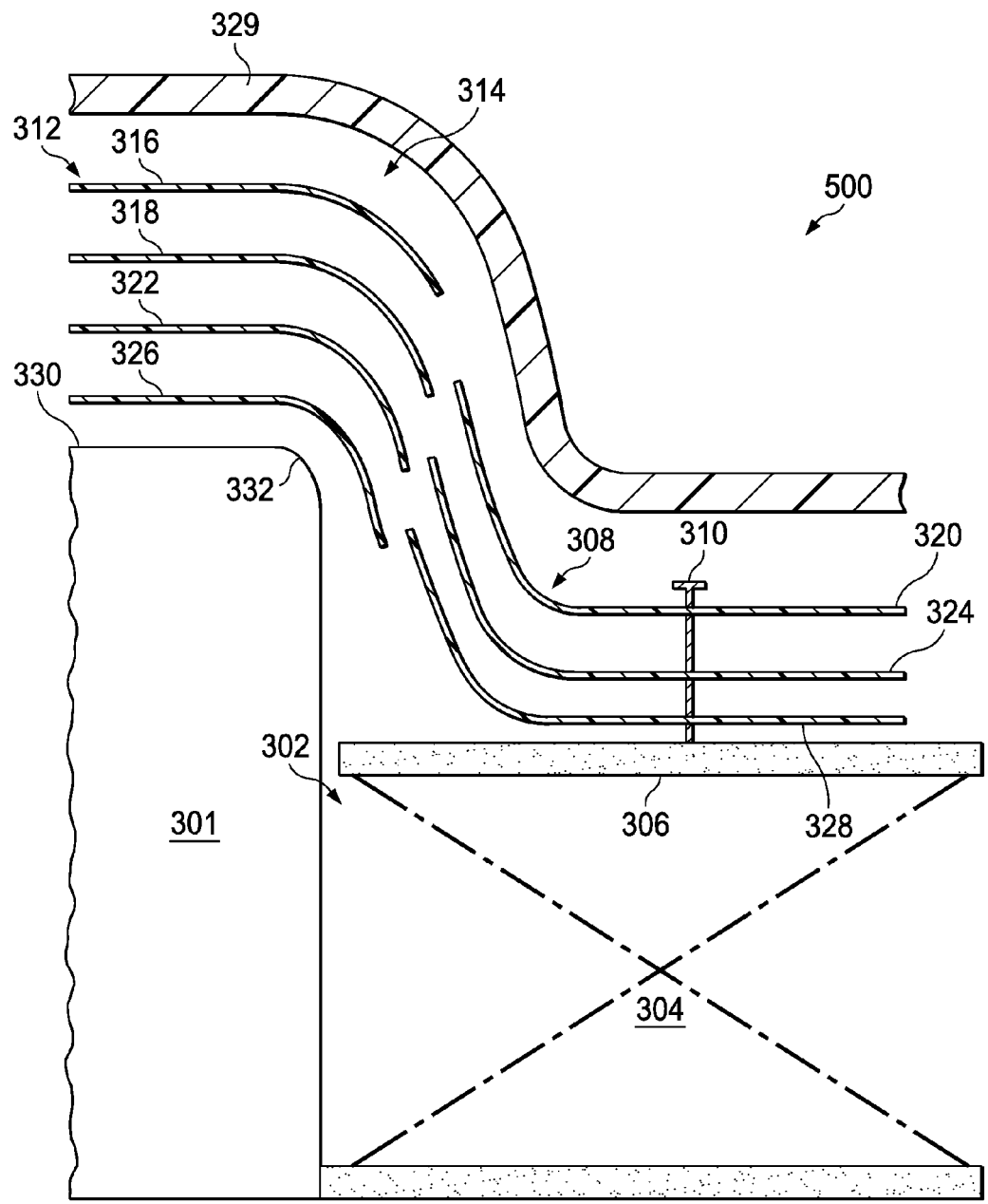
FIG. 5 is an illustration of a cross-sectional view of a forming tool and composite material during forming in accordance with an illustrative embodiment.

Turning now to FIG. 5, an illustration of a cross-sectional view of a forming tool and composite material during forming is depicted in accordance with an illustrative embodiment. In view 500, movement system 304 has lowered plate 306 to a depressed position. Sheets 308 have been removed from plies 312 due to lowering plate 306. As depicted, plies 312 may be progressively formed to edge 332.

Figure 6:
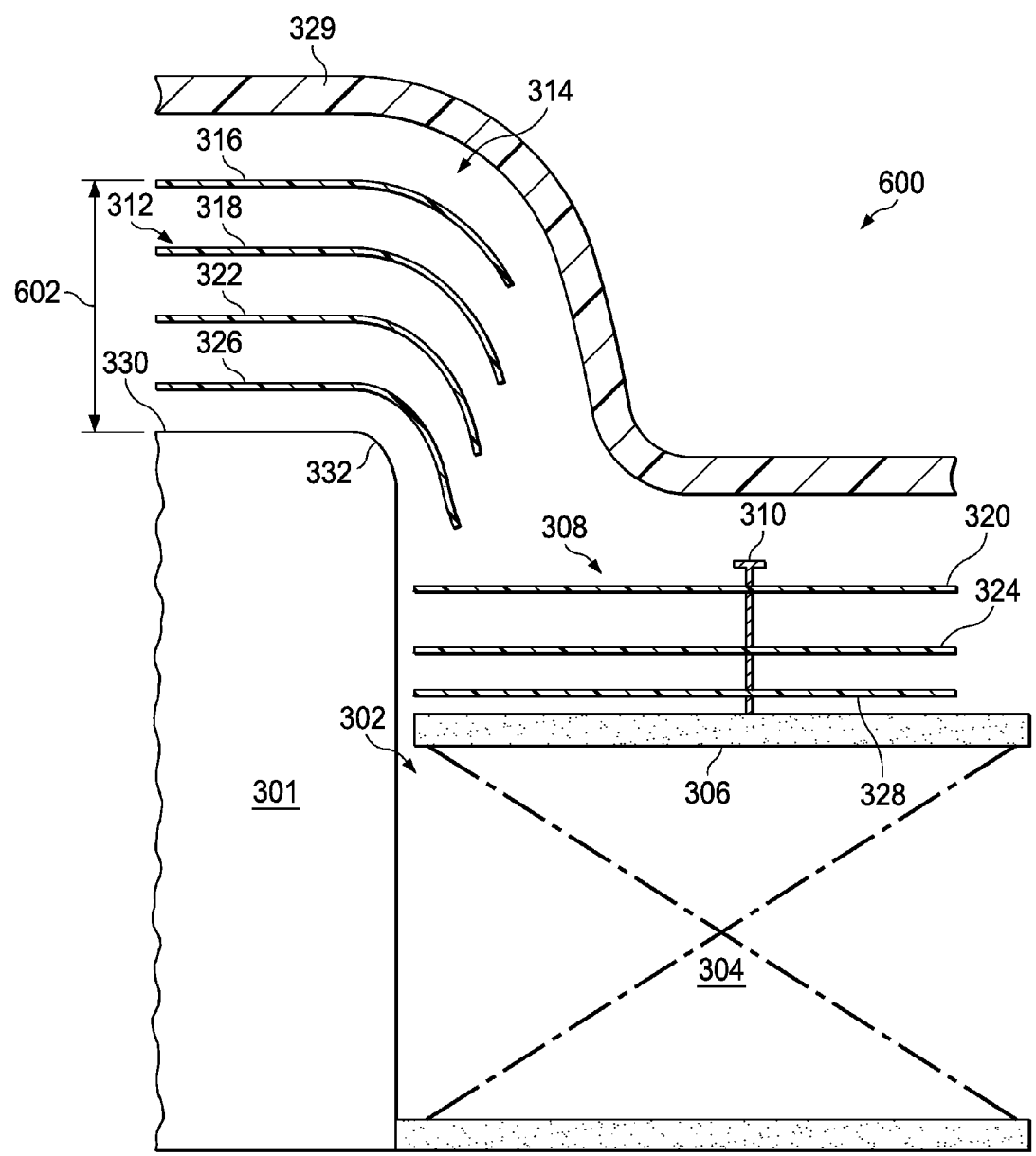
FIG. 6 is an illustration of a cross-sectional view of a forming tool and composite material during forming in accordance with an illustrative embodiment.

Turning now to FIG. 6, an illustration of a cross-sectional view of a forming tool and composite material during forming is depicted in accordance with an illustrative embodiment. In view 600, movement system 304 has lowered plate 306 to a depressed position. Sheets 308 are substantially flat against plate 306. As depicted, plies 312 may be progressively formed to edge 332. Plies 312 may have height 602 in view 600.

Figure 7:
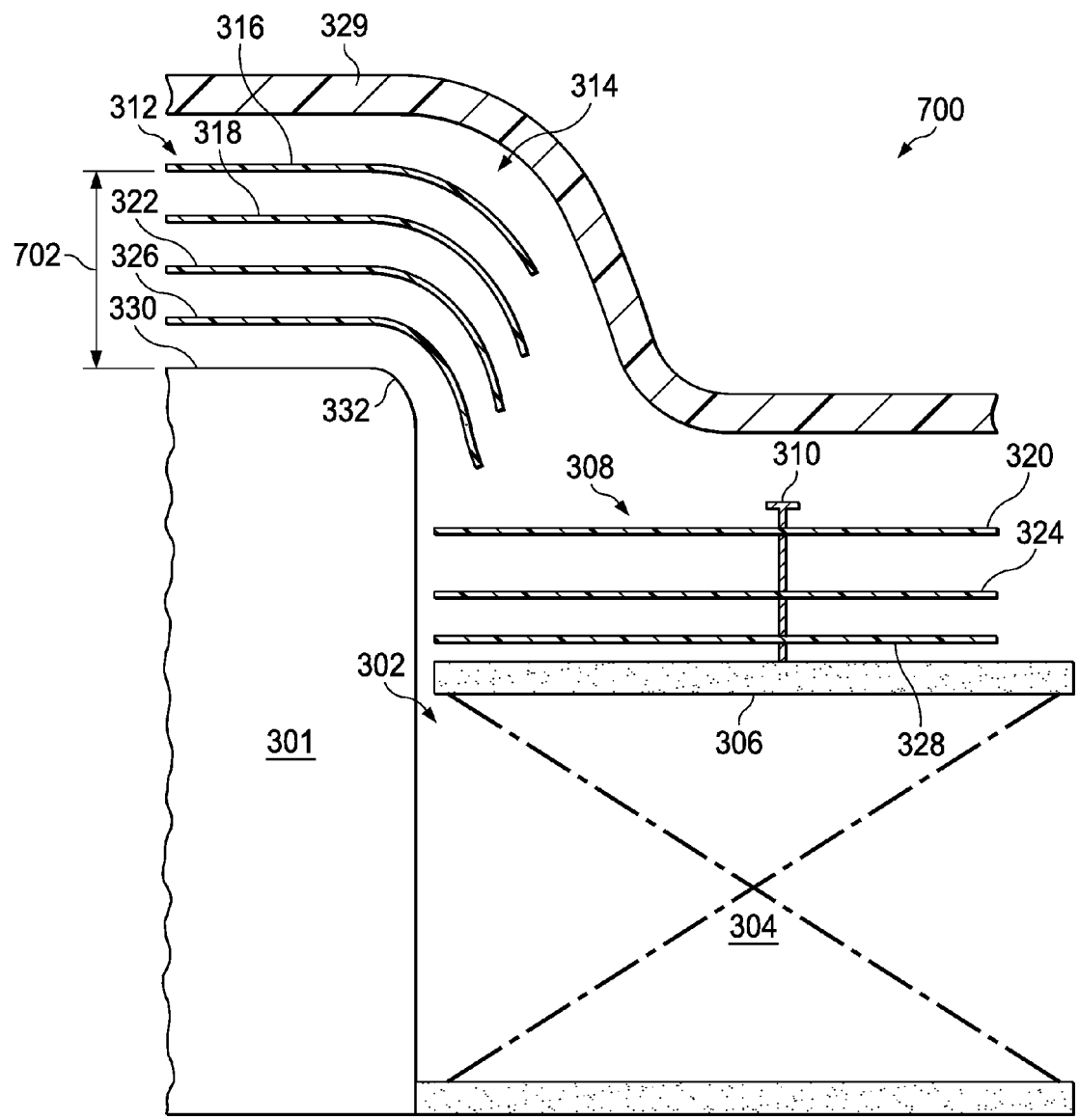
FIG. 7 is an illustration of a cross-sectional view of a forming tool and composite material during forming in accordance with an illustrative embodiment.

Turning now to FIG. 7, an illustration of a cross-sectional view of a forming tool and composite material during forming is depicted in accordance with an illustrative embodiment. In view 700, plies 312 have been formed to base 302 including edge 332. The vacuum pulled under drape 329 may compress plies 312 onto base 302. Further, the vacuum pulled under drape 329 may remove gases from between plies 312. As can be seen in view 700, height 702 of plies 312 is less than height 602 of plies 312 in FIG. 6. As can be seen in view 700, plies 312 may be compressed against base 302 to form a substantially wrinkle-free part. Each ply of plies 312 may be compressed against each adjacent ply of plies 312.

As depicted, plate 306 may move in a single dimension in FIGS. 3-7. This type of motion may be referred to as translational movement. However, in some illustrative examples plate 306 may move in more than one dimension relative to base 302. For example, plate 306 may move in a rotational movement. As one example, plate 306 may pivot about an edge of plate 306 opposite edge 332 of base 302. As another example, plate 306 may pivot about the edge of plate 306 nearest edge 332. Plate 306 may move in any desirable translational or rotational movement such that sheets 308 may be pulled from between each of plies 312 resulting in a composite part of desirable quality.

Further, although plate 306 is described as moving relative to base 302, in some illustrative examples, base 302 may move relative to plate 306. Further, in some illustrative examples base 302 may have rotational movement relative to plate 306. Base 302 may move in any desirable translational or rotational movement such that sheets 308 may be pulled from between each of plies 312 resulting in a composite part of desirable quality.

Figure 8:
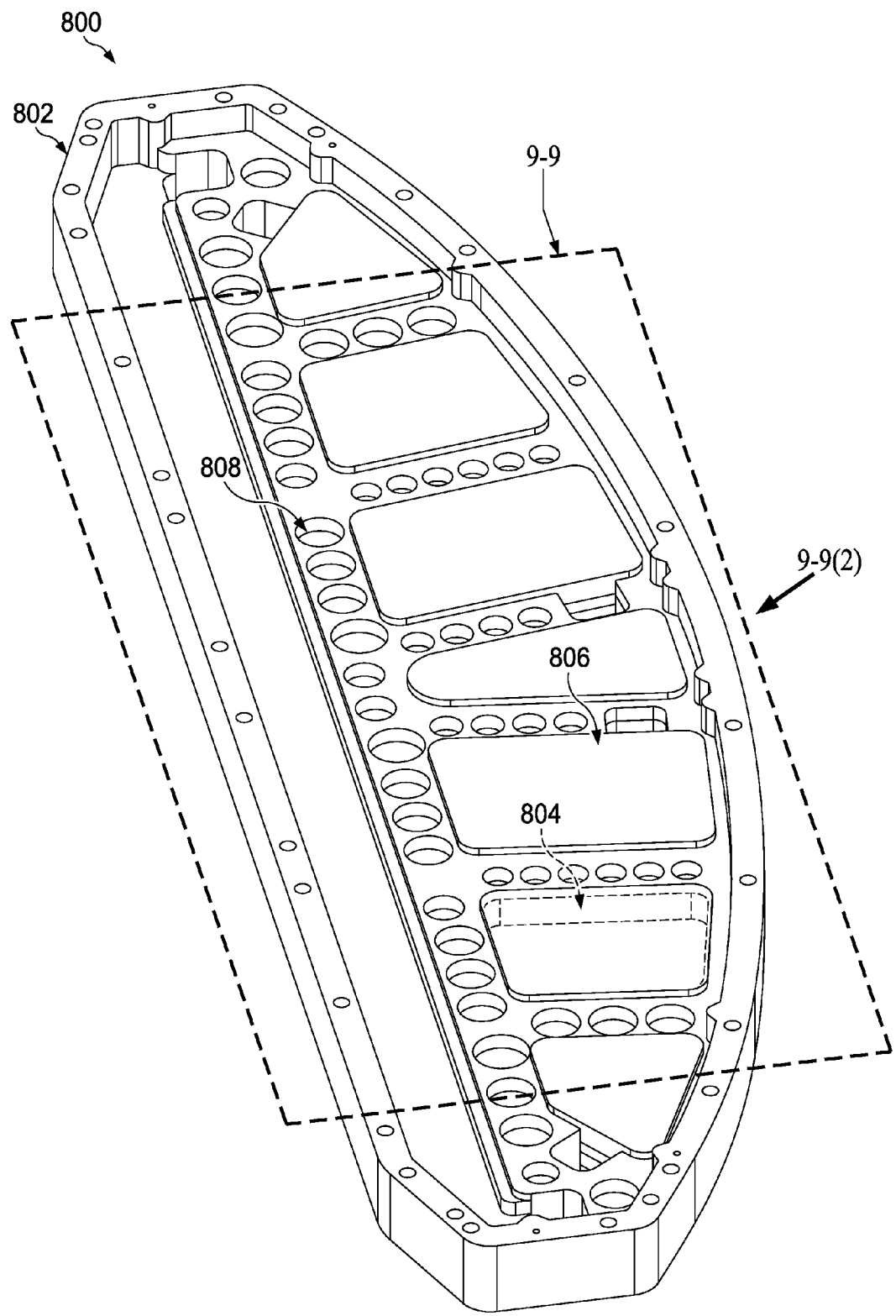
FIG. 8 is an illustration of an isometric view of a forming tool in accordance with an illustrative embodiment.

Turning now to FIG. 8, an illustration of an isometric view of a forming tool is depicted in accordance with an illustrative embodiment. Forming tool 800 may be a physical implementation of forming tool 202 of FIG. 2. Forming tool 800 may be used to form a cargo floor beam. Forming tool 800 may have base 802 with number of cavities 804. Number of plates 806 may cover some of number of cavities 804. Cavities 808 of number of cavities 804 may be present in base 802 to reduce the weight of forming tool 800. Cavities 808 of number of cavities 804 may also advantageously affect the thermal properties of forming tool 800.

FIG. 8 and forming tool 800 not meant to imply physical or architectural limitations to the manner in which an illustrative embodiment may be implemented. Although forming tool 800 is depicted as a tool to form a cargo floor beam, forming tool 800 may have any desirable shape or number of cavities. For example, forming tool 800 could be a tool to form a complex structure such as a bulkhead. As another example, forming tool 800 could be a tool to form an aircraft door.

Figure 9:
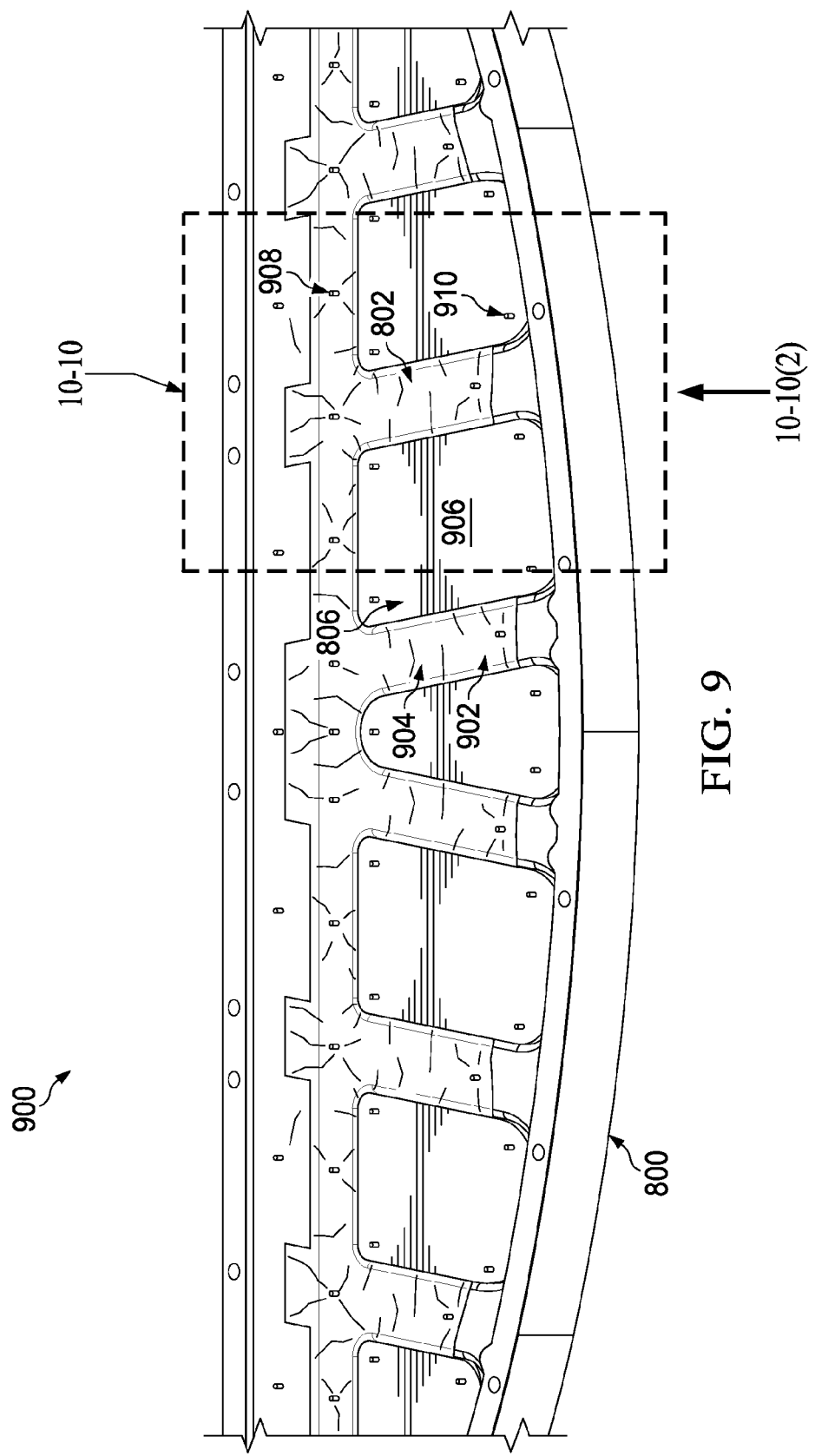
FIG. 9 is an illustration of a portion of a forming tool and composite material in accordance with an illustrative embodiment.

Turning now to FIG. 9, an illustration of a portion of a forming tool and composite material is depicted in accordance with an illustrative embodiment. View 900 may be a view of forming tool 800 within box 9-9 from direction 9-9(2) of FIG. 8. In view 900, plies 902 of composite material 904 may be present on base 802. Plies 902 of composite material 904 may be successively placed on base 802. Sheets 906 may be placed over number of plates 806. Plies 902 and portions of sheets 906 may be interleaved on forming tool 800.

Pins 908 may extend from base 802 through plies 902. Pins 908 may maintain a position of plies 902 relative to base 802 in select locations on forming tool 800. Pins 910 may extend from plates 806 through sheets 906. Pins 910 may maintain a position of sheets 906 relative to plates 806 in select locations.

Figure 10:
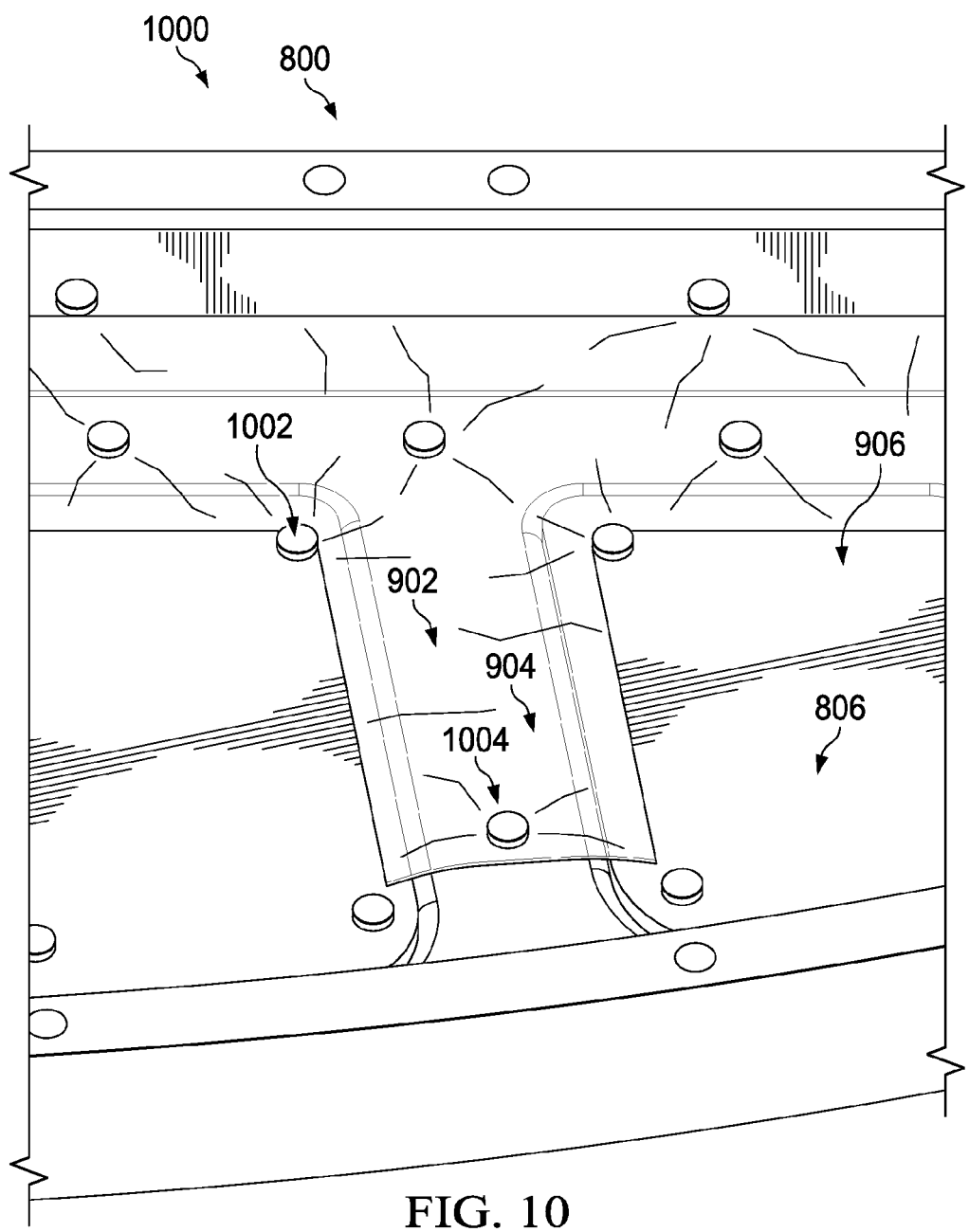
FIG. 10 is an illustration of a portion of a forming tool and composite material in accordance with an illustrative embodiment.

Turning now to FIG. 10, an illustration of a portion of a forming tool and composite material is depicted in accordance with an illustrative embodiment. View 1000 may be a view of forming tool 800 within box 10-10 from direction 10-10(2) of FIG. 9. Connectors 1002 may hold sheets 906 on number of plates 806 shown in FIG. 8. Connectors 1002 may include first portions inserted through sheets 906 and second portions on top of sheets 906 and connected to the first portions of connectors 1002. The first portions of connectors 1002 may be pins 910 of FIG. 9. Connectors 1004 may hold plies 902 on forming tool 800. Connectors 1004 may include first portions inserted through plies 902 and second portions on top of plies 902. The first portions of connectors 1004 may be pins 908 of FIG. 9.

Figure 11:
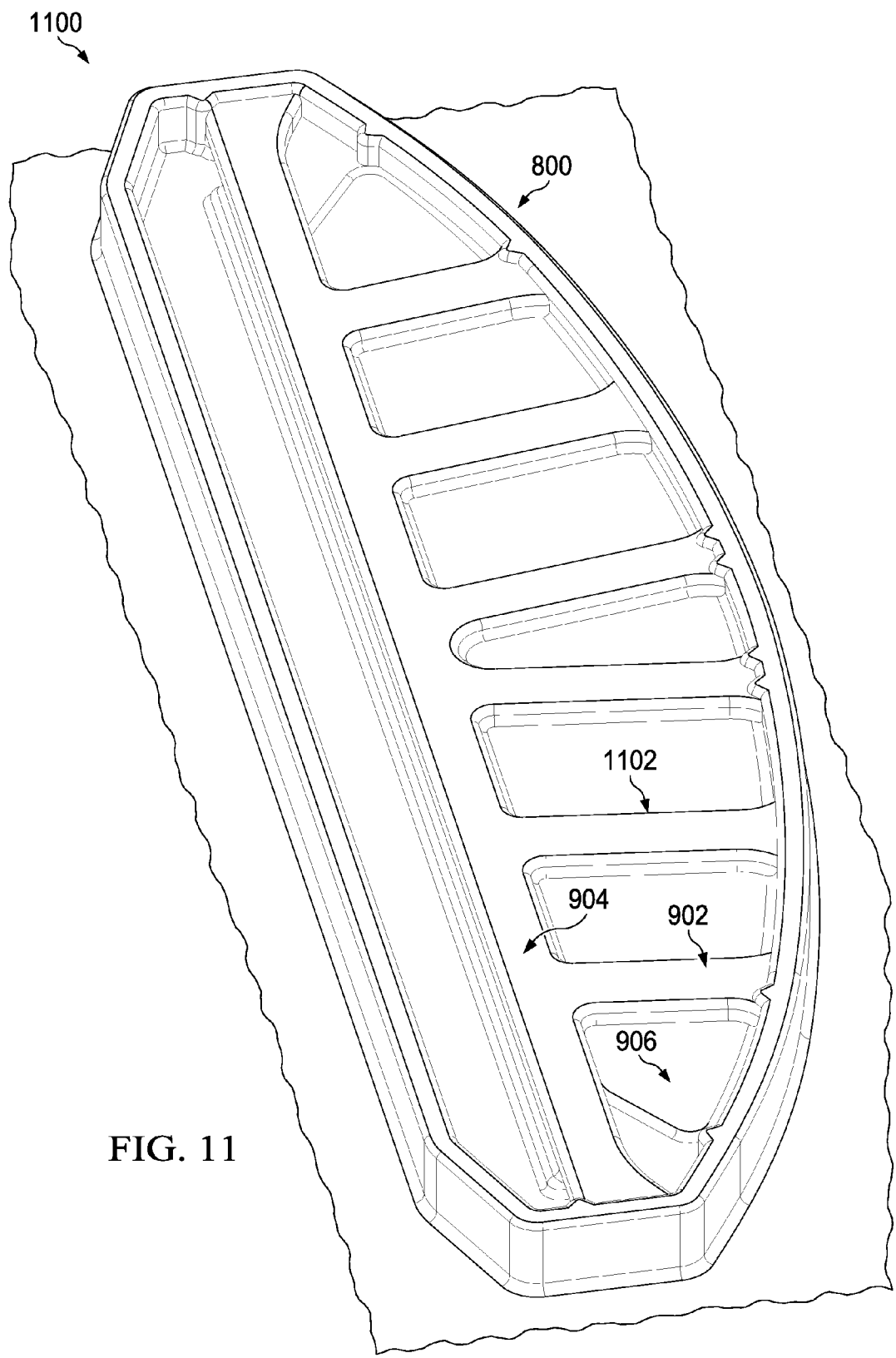
FIG. 11 is an illustration of a forming tool during forming in accordance with an illustrative embodiment.

Turning now to FIG. 11, an illustration of a forming tool during forming is depicted in accordance with an illustrative embodiment. View 1100 may be a view of forming tool 800 with drape 1102 placed over forming tool 800, plies 902 of composite material 904, and sheets 906. View 1100 may be a view of forming tool 800 covered with drape 1102 and with number of plates 806 lowered to a depressed state.

Figure 12:
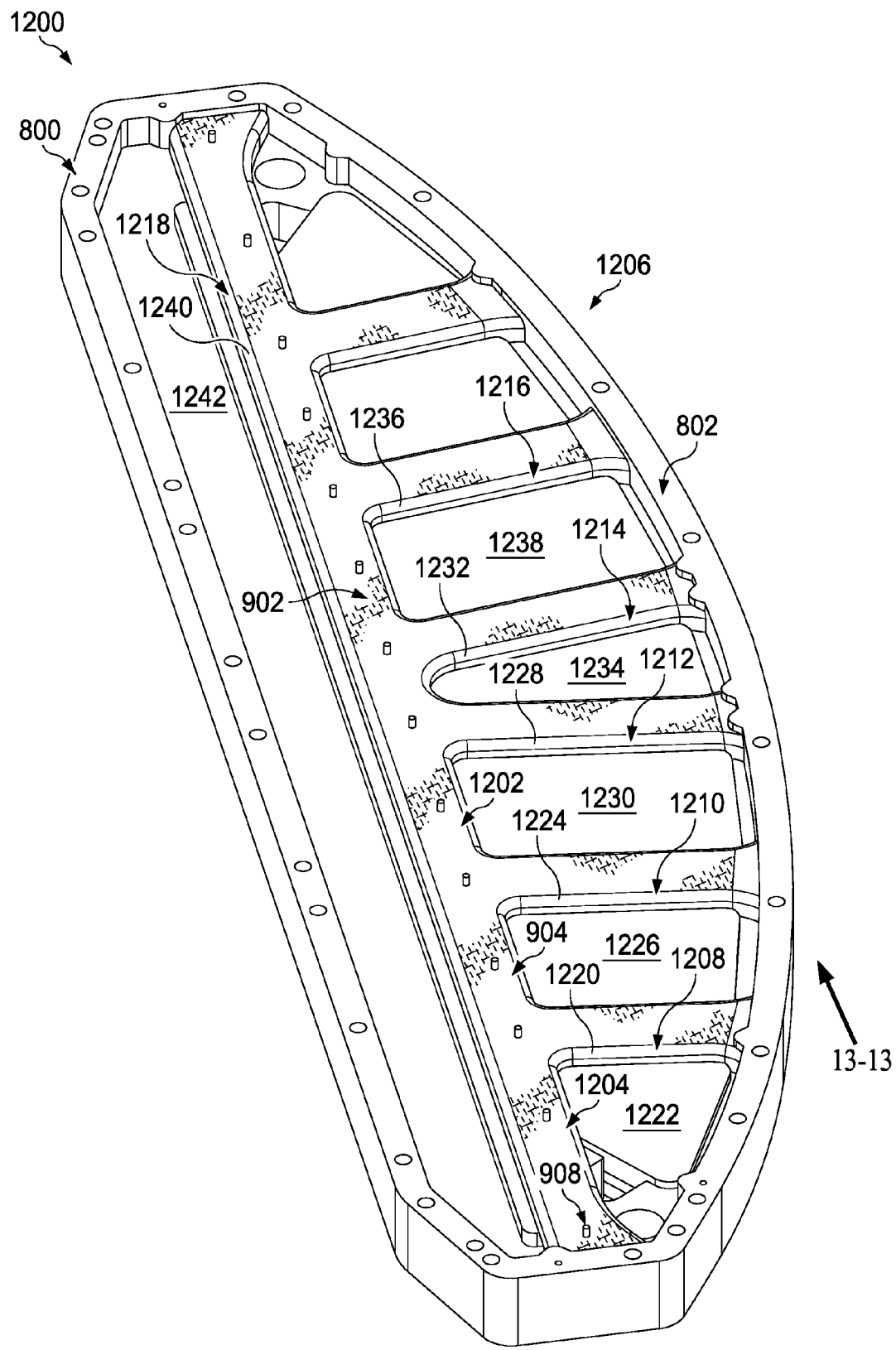
FIG. 12 is an illustration of a composite material on a forming tool after forming in accordance with an illustrative embodiment.

Turning now to FIG. 12, an illustration of a composite material on a forming tool after forming is depicted in accordance with an illustrative embodiment. View 1200 may be a view of forming tool 800 with composite material 904 after forming and removal of drape 1102. In this illustrative example, composite material 904 has been formed into composite structure 1202 having shape 1204. Shape 1204 has number of flanges 1206 including flange 1208, flange 1210, flange 1212, flange 1214, flange 1216, and flange 1218. Flange 1208 may be created by forming plies 902 to base 802 including forming over edge 1220 of cavity 1222. Flange 1210 may be created by forming plies 902 to base 802 including forming over edge 1224 of cavity 1226. Flange 1212 may be created by forming plies 902 to base 802 including forming over edge 1228 of cavity 1230. Flange 1214 may be created by forming plies 902 to base 802 including forming over edge 1232 of cavity 1234. Flange 1216 may be created by forming plies 902 to base 802 including forming over edge 1236 of cavity 1238. Flange 1218 may be created by forming plies 902 to base 802 including forming over edge 1240 of cavity 1242.

As can be seen from view 1200, connectors 1002 may be removed after forming composite material 904. Pins 908 may still be present through composite structure 1202. Second portions of connectors 1004 may have been removed to facilitate removal of composite structure 1202 from base 802 of forming tool 800.

Figure 13:
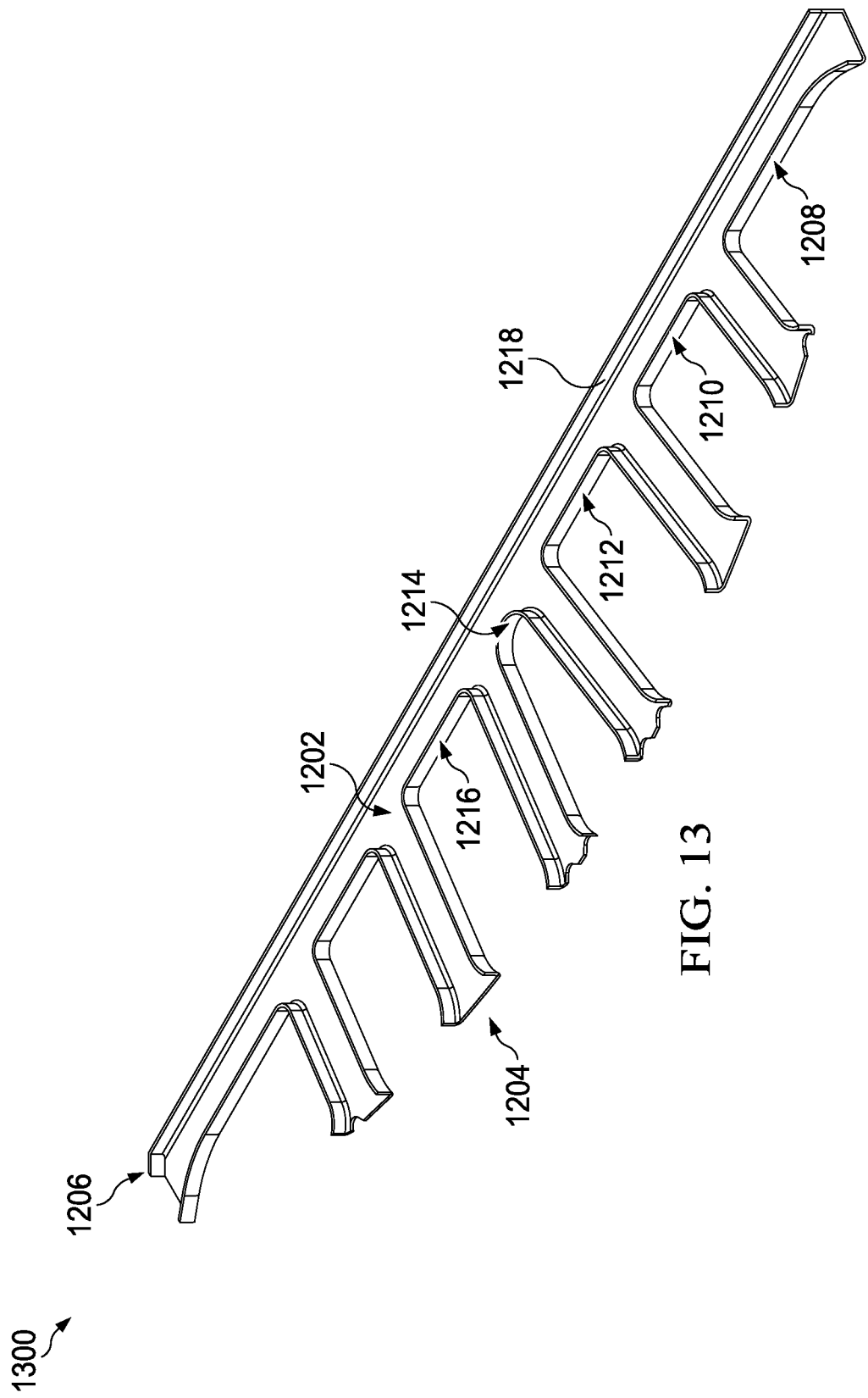
FIG. 13 is an illustration of a composite structure formed on a forming tool in accordance with an illustrative embodiment.

Turning now to FIG. 13, an illustration of a composite structure formed on a forming tool is depicted in accordance with an illustrative embodiment. View 1300 may be a view of composite structure 1202 from the direction of 13-13 in FIG. 12.

Figure 14:
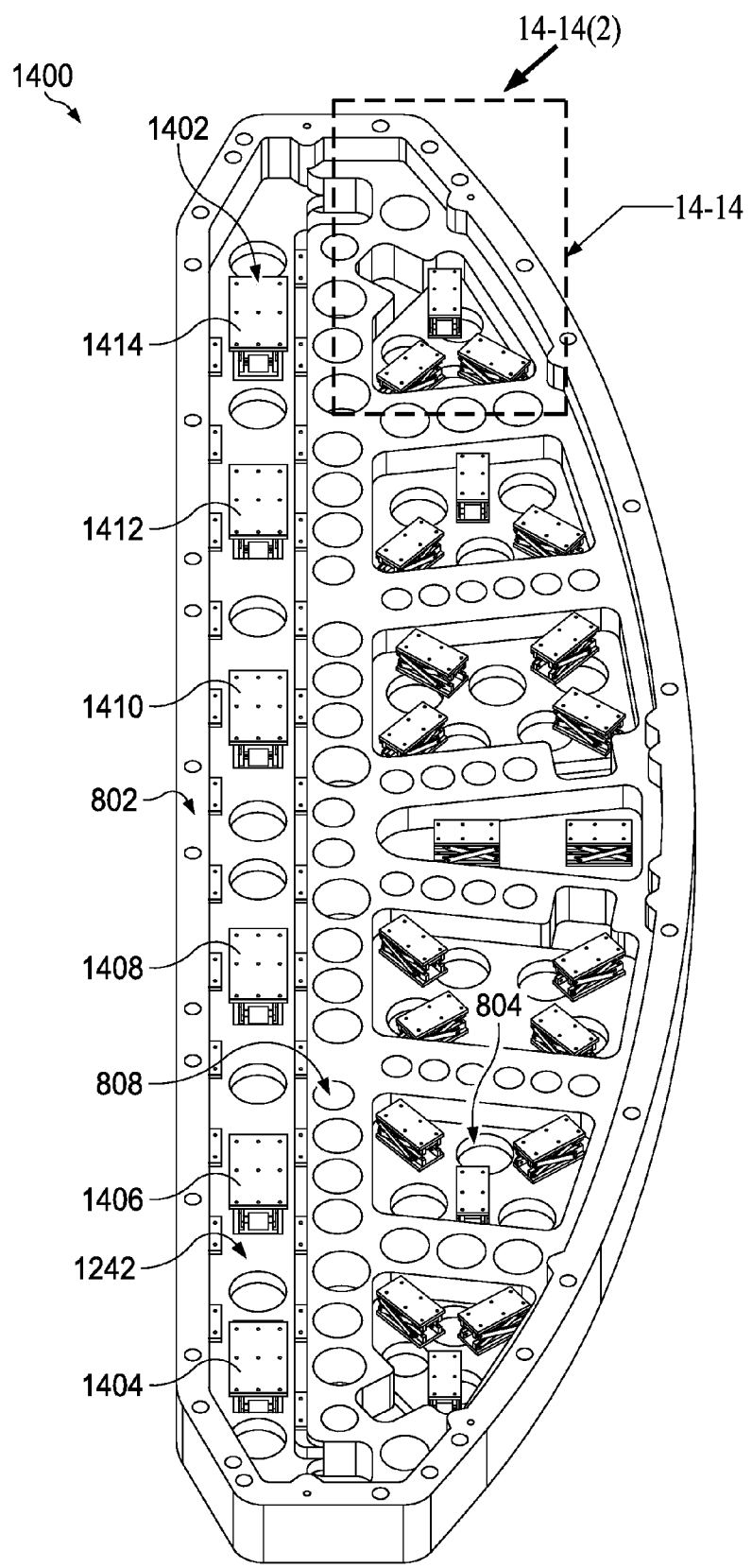
FIG. 14 is an illustration of a forming tool with a number of movement systems within a number of cavities in accordance with an illustrative embodiment.

Turning now to FIG. 14, an illustration of a forming tool with a number of movement systems within a number of cavities is depicted in accordance with an illustrative embodiment. View 1400 is a view of forming tool 800 with number of plates 806 removed for clarity. Number of movement systems 1402 may be positioned within number of cavities 804. In this illustrative example, cavity 1242 may have movement system 1404, movement system 1406, movement system 1408, movement system 1410, movement system 1412, and movement system 1414. In this illustrative example, each of number of movement systems 1402 is a scissor lift. In some illustrative examples, at least one of movement systems 1402 may be a movement system other than a scissor lift such as an electrical system, a pneumatic system, or a different type of mechanical system.

Figure 15:
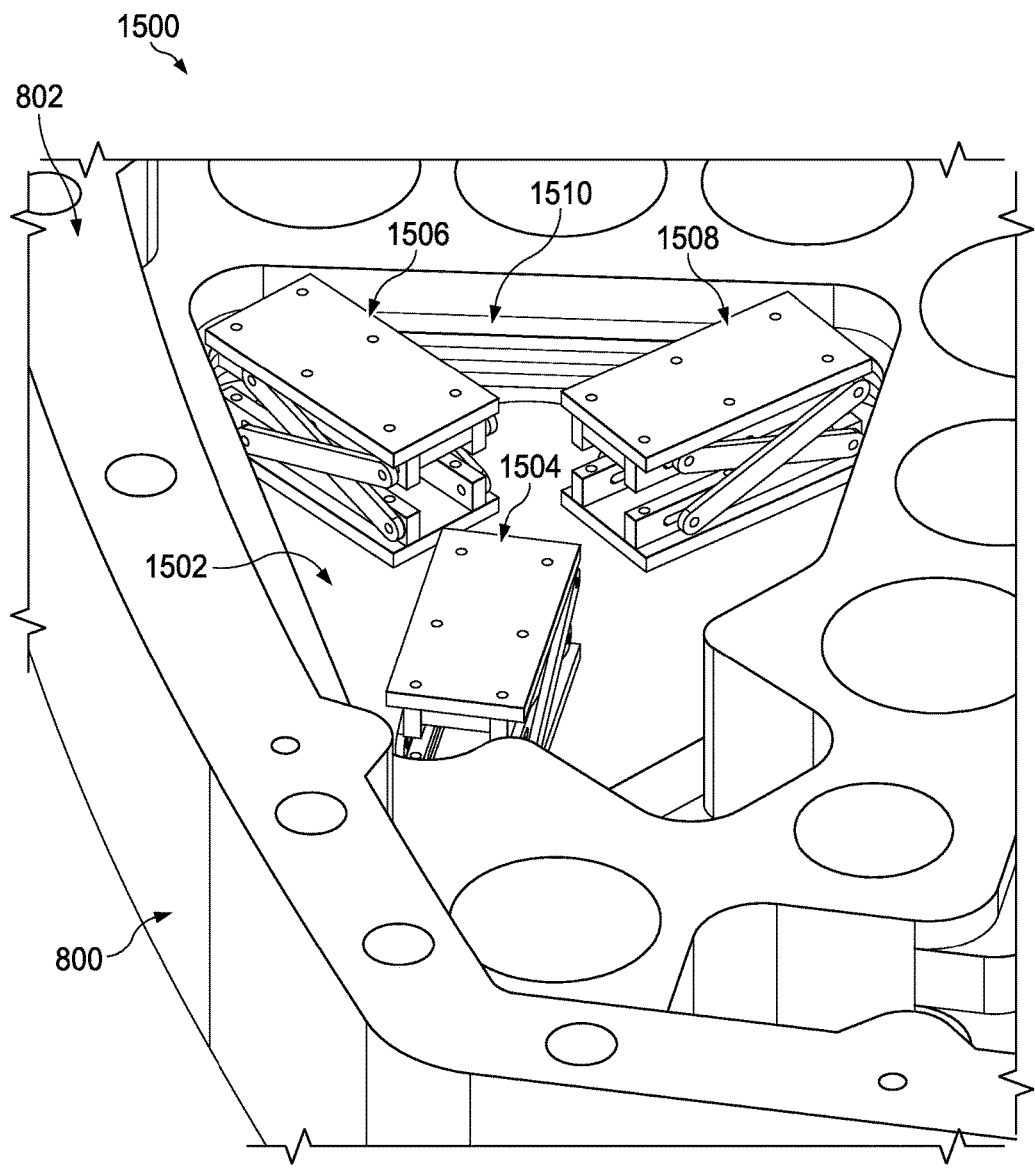
FIG. 15 is an illustration of a number of movement systems within a cavity of a forming tool in accordance with an illustrative embodiment.

Turning now to FIG. 15, an illustration of a number of movement systems within a cavity of a forming tool is depicted in accordance with an illustrative embodiment. View 1500 may be a view of cavity 1502 of number of cavities 804 within box 14-14 and from direction 14-14(2) of FIG. 14.

Movement system 1504, movement system 1506, and movement system 1508 of number of movement systems 1402 are present within cavity 1502. Movement system 1504, movement system 1506, and movement system 1508 are each in an extended position. In an extended position, a plate associated with movement system 1504, movement system 1506, and movement system 1508 may be substantially planar with base 802 of forming tool 800.

Movement system 1504, movement system 1506, and movement system 1508 may be lowered to a depressed position. In lowering each of movement system 1504, movement system 1506, and movement system 1508, a plate associated with each of movement system 1504, movement system 1506, and movement system 1508 may also be lowered. When movement system 1504, movement system 1506, and movement system 1508 are in a depressed position, the plate associated with movement system 1504, movement system 1506, and movement system 1508 may rest on ledge 1510 of cavity 1502.

Figure 16:
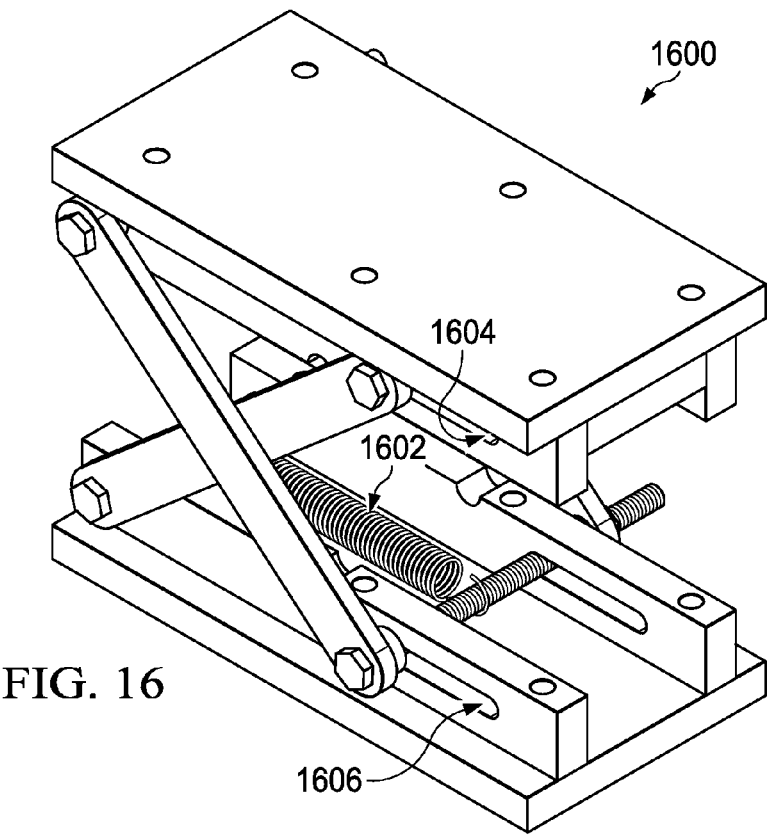
FIG. 16 is an illustration of a scissor lift in an extended position in accordance with an illustrative embodiment.

Turning now to FIG. 16, an illustration of a scissor lift in an extended position is depicted in accordance with an illustrative embodiment. Scissor lift 1600 may be a physical implementation of a scissor lift of scissor lifts 252 of FIG. 2. Scissor lift 1600 may be a movement system of number of movement systems 1402 of FIG. 14. Scissor lift 1600 may be an example of a physical implementation of movement system 304 of FIG. 3.

Scissor lift 1600 may have spring 1602 biasing scissor lift 1600 in an extended position. By biasing scissor lift 1600 in an extended position, scissor lift 1600 may push a plate against drape 1102 shown in FIG. 11. The load for spring 1602 may be selected based on a desired relative surface pressure between plies 902 and sheets 906 shown in FIGS. 9-11 during forming. In some illustrative examples, the load for spring 1602 may be approximately 2 pounds. A surface pressure between plies 902 and sheets 906 may affect the relative sliding motion between plies 902 in the normal and transversal direction.

Scissor lift 1600 may have guide 1604 and guide 1606. Guide 1604 and guide 1606 may cause the movement of scissor lift 1600 to be smooth. Further, guide 1604 and guide 1606 may limit the height of scissor lift 1600 when extended and the height of scissor lift 1600 when depressed.

Figure 17:
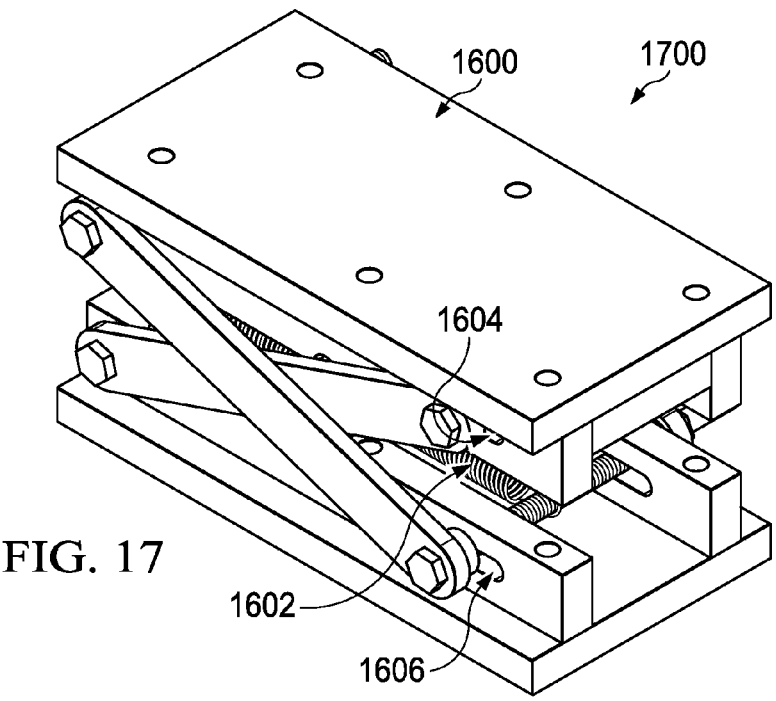
FIG. 17 is an illustration of a scissor lift in a depressed position in accordance with an illustrative embodiment.

Turning now to FIG. 17, an illustration of a scissor lift in a depressed position is depicted in accordance with an illustrative embodiment. In view 1700, scissor lift 1600 may be in a depressed position.

The illustration of aircraft 100 in FIG. 1, manufacturing environment 200 in FIG. 2, forming tool depictions in FIGS. 3-12 and 14-15, movement systems in FIGS. 16-17, and composite structure in FIG. 13 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although plies 204 are depicted as including first ply 268, second ply 270, and third ply 272, plies 204 may include any number of plies. In some illustrative examples, plies 204 includes between 2 and 10 plies. In some illustrative examples, plies 204 may include between 10 and 20 plies. In some illustrative examples, plies 204 may include between 20 and 50 plies.

As another example, although plate 306 is shown moving relative to base 302 of forming tool 301 in FIGS. 3-7, in some illustrative examples base 302 may move relative to plate 306. For example, base 302 may move upward while plate 306 remains stationary. In other illustrative examples, plate 306 may move downward while base 302 moves upward.

As yet another example, although plate 306 is shown moving in a single dimension in FIGS. 3-7, in some illustrative examples plate 306 may move in more than one dimension relative to base 302. For example, plate 306 may move in a rotational movement. Further, in some illustrative examples base 302 may have rotational movement relative to plate 306.

The different components shown in FIGS. 1 and 3-17 may be combined with components in FIG. 2, used with components in FIG. 2, or a combination of the two. Additionally, some of the components in FIGS. 1 and 3-17 may be illustrative examples of how components shown in block form in FIG. 2 may be implemented as physical structures.

Figure 18:
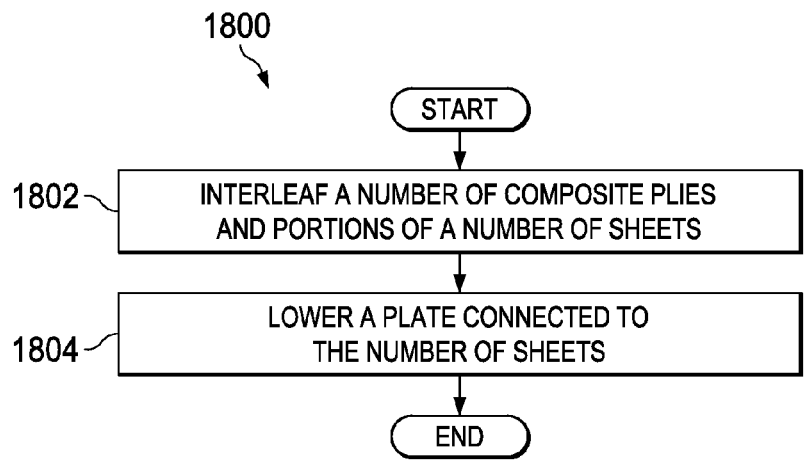
FIG. 18 is an illustration of a flowchart of a process for forming a composite structure in accordance with an illustrative embodiment.

Turning now to FIG. 18, an illustration of a flowchart of a process for forming a composite structure is depicted in accordance with an illustrative embodiment. Process 1800 may be used to form composite structure 206 of FIG. 2. Process 1800 may begin by interleaving a number of composite plies and portions of a number of sheets (operation 1802). Portions of the number of sheets may be interleafed with the composite plies in a periphery of an area. In some illustrative examples, the periphery of the area is a portion of the composite plies which will be formed over an edge of a cavity within a forming tool. Portions of the number of sheets may be interleafed with the composite plies.

Process 1800 may also lower a plate connected to the number of sheets (operation 1804). Afterwards, the process terminates. Lowering the plate connected to the number of sheets may pull the portions of the number of sheets from between each of the number of composite plies. Lowering the plate forms the number of sheets against the plate. In some illustrative examples, the plate connected to the number of sheets may be lowered while the number of composite plies and the number of sheets is under vacuum.

Figure 19:
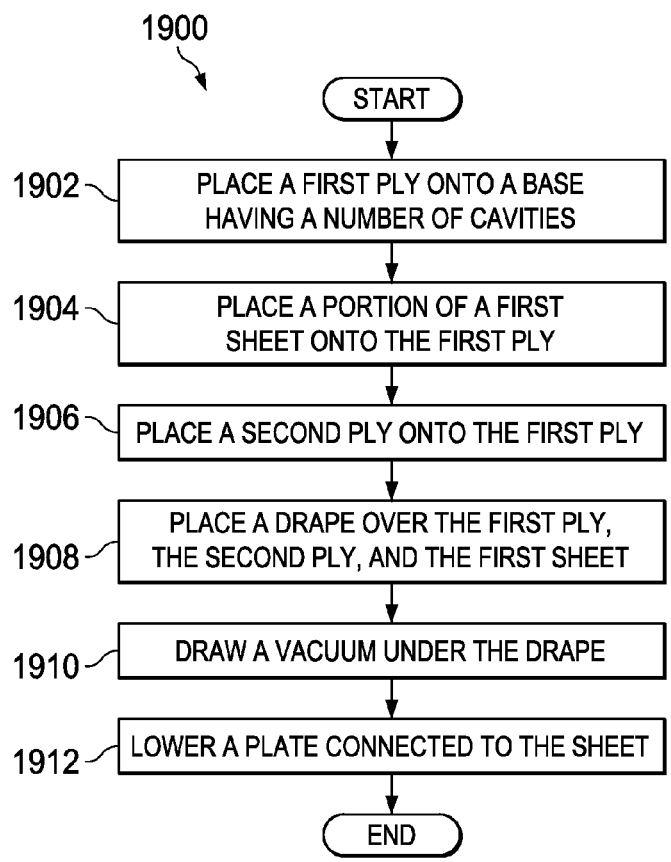
FIG. 19 is an illustration of a flowchart of a process for forming a composite structure in accordance with an illustrative embodiment.

Turning now to FIG. 19, an illustration of a flowchart of a process for forming a composite structure is depicted in accordance with an illustrative embodiment. Process 1900 may be used to form composite structure 206 of FIG. 2. Process 1900 may begin by placing a first ply onto a base having a number of cavities (operation 1902). The first ply may be either a thermoplastic composite material or a thermoset composite material. Process 1900 may also place a portion of a sheet onto the first ply (operation 1904). The sheet may be a material selected to reduce friction between the sheet and the first ply. In some illustrative examples, the sheet may be a polymeric material. In some other illustrative examples, the sheet may be polytetrafluoroethylene or polyethylene.

Process 1900 may then place a second ply onto the first ply (operation 1906). The second ply may be the same type of composite material as the first ply. However, the second ply may be laid at a different angle than the first ply. For example, the first ply may be a 0 degree ply. The second ply may be a ply laid at an angle other than 0 degrees.

Process 1900 may also place a drape over the first ply, the second ply, and the first sheet (operation 1908). If subsequent plies and sheets have been placed following the first ply, the second ply, and the first sheet, the drape may also be placed over the subsequent plies and sheets.

Process 1900 may draw a vacuum under the drape (operation 1910). Process 1900 may also lower a plate connected to the sheet (operation 1912). In some illustrative examples, the plate may be lowered as a result of drawing the vacuum under the drape. In some illustrative examples, a number of movement systems may be below the plate. Further, the number of movement systems may provide some amount of resistance to downward pressure from the drape. Afterwards, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, process 1800 may also draw a vacuum on the number of composite plies and the number of sheets. As another example, process 1800 may also place a drape over the number of composite plies and the number of sheets. Drawing the vacuum on the number of composite plies and the number of sheets may include pulling a vacuum under the drape.

In some illustrative examples, process 1800 may also place the number of composite plies on a base having a cavity. The plate may be associated with the cavity, and lowering the plate connected to the number of sheets may form the number of composite plies to the base. In some illustrative examples, forming the number of composite plies to the base includes forming a portion of the number of composite plies to the base within the cavity.

In some illustrative examples, process 1800 may also heat the composite plies to a forming temperature prior to lowering the plate. In these illustrative examples, the composite plies may be a thermoplastic material.

In some illustrative examples, in process 1900, lowering the plate connected to the sheet may pull the portion of the sheet from between the first ply and the second ply. In some illustrative examples, in process 1900, lowering the plate may form the sheet against the plate. In some illustrative examples, in process 1900, lowering the plate connected to the number of sheets may form the first ply and the second ply to the base. In these illustrative examples, forming the first ply and the second ply to the base may include forming a portion of the first ply and a portion of the second ply to the base within the cavity. In some illustrative examples, process 1900 may also heat the first ply and the second ply to a forming temperature prior to lowering the plate.

Figure 20:
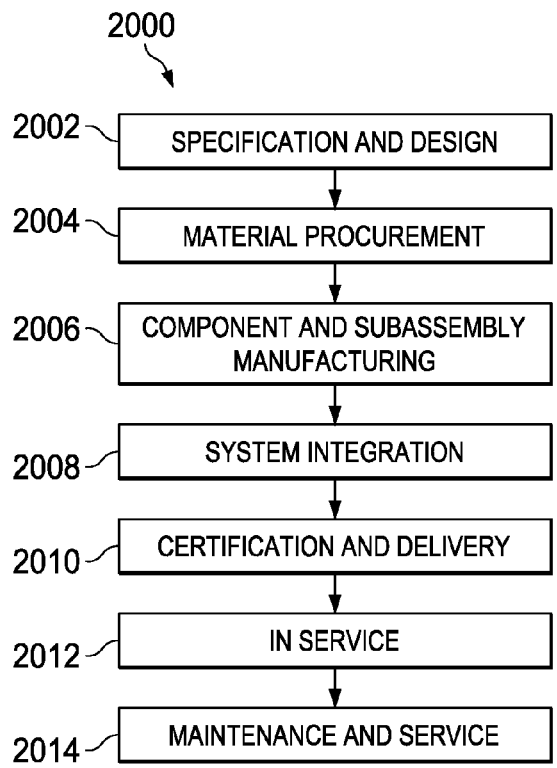
FIG. 20 is an illustration of an aircraft manufacturing and service method in the form of a block diagram in accordance with an illustrative embodiment.
Figure 21:
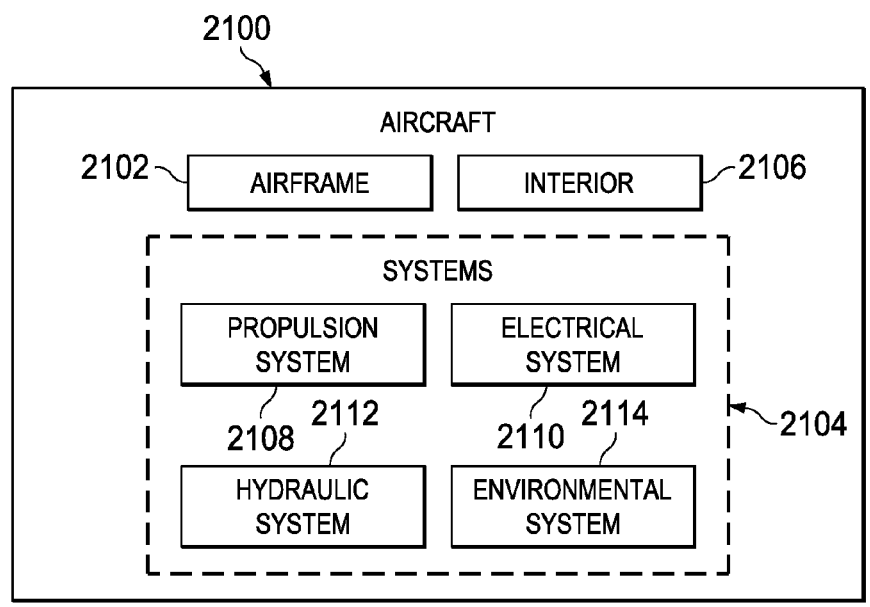
FIG. 21 is an illustration of an aircraft in the form of a block diagram in which an illustrative embodiment may be implemented.

The illustrative embodiments of the present disclosure may be described in the context of aircraft manufacturing and service method 2000 as shown in FIG. 20 and aircraft 2100 as shown in FIG. 21. Turning first to FIG. 20, an illustration of a block diagram of an aircraft manufacturing and service method is depicted in accordance with an illustrative embodiment. During pre-production, aircraft manufacturing and service method 2000 may include specification and design 2002 of aircraft 2100 in FIG. 21 and material procurement 2004.

During production, component and subassembly manufacturing 2006 and system integration 2008 of aircraft 2100 in FIG. 21 takes place. Thereafter, aircraft 2100 in FIG. 21 may go through certification and delivery 2010 in order to be placed in service 2012. While in service 2012 by a customer, aircraft 2100 in FIG. 21 is scheduled for routine maintenance and service 2014, which may include modification, reconfiguration, refurbishment, and other maintenance or service.

Each of the processes of aircraft manufacturing and service method 2000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 21, an illustration of a block diagram of an aircraft is depicted in which an illustrative embodiment may be implemented. In this example, aircraft 2100 is produced by aircraft manufacturing and service method 2000 in FIG. 20 and may include airframe 2102 with plurality of systems 2104 and interior 2106. Examples of systems 2104 include one or more of propulsion system 2108, electrical system 2110, hydraulic system 2112, and environmental system 2114. Any number of other systems may be included. Although an aerospace example is shown, different illustrative embodiments may be applied to other industries, such as the automotive industry.

The apparatuses and methods embodied herein may be employed during at least one of the stages of aircraft manufacturing and service method 2000 in FIG. 20. One or more illustrative embodiments may be used during component and subassembly manufacturing 2006. For example, forming tool 202 may be used to form composite structure 206 during component and subassembly manufacturing 2006. Further, composite structure 206 formed using forming tool 202 may also be used to replace a composite structure during maintenance and service 2014.

The illustrative embodiments provide a method and apparatus for progressively forming composite material. The method and apparatus may produce a composite structure by progressively forming each ply individually. A periphery of each ply to be formed may only touch other adjacent plies after the periphery has been formed.

Prior to forming a periphery of a ply, a sheet may separate the periphery of the ply from an adjacent ply. The sheet may be formed of a material selected to reduce the friction between the sheet and the ply.

An apparatus may comprise a base, a plate, a number of movement systems, and a number of sheets. The base may have a number of cavities. The plate may be associated with a cavity of the number of cavities. The number of movement systems may be within the cavity of the number of cavities. The number of sheets may be connected to the plate.

A vacuum may be drawn on a number of composite plies on the apparatus and the number of sheets. The plate connected to the number of sheets may be lowered while the number of composite plies and the number of sheets is under the vacuum.

As the plate is lowered, the number of sheets may be progressively pulled from between the number of composite plies. As the plate is lowered, the number of composite plies may be formed against the tool. In some illustrative examples, the composite plies may be formed on an edge of a cavity of the tool. Features such as bends, holes, flanges, or other desirable features may be formed into the composite plies to form a composite structure.

The composite structure may have a desirable quality. The composite structure may be substantially free of wrinkles. By forming composite structure 206 using forming tool 202 including number of sheets 222 and number of plates 220, at least one of manufacturing time and manufacturing cost may be reduced. For example, by forming composite structure 206 using forming tool 202, rework and discard rates may be reduced. By reducing rework and discards, manufacturing cost may be reduced.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
  laying up a number of composite plies onto a base and overlapping onto a plate, wherein:
    the number of composite plies is interleaved along a periphery with portions of a number of sheets laid up on the plate to form an overlap; and
    the number of sheets is connected to the plate;
  placing a drape directly over the number of composite plies and the number of sheets; and
  lowering the plate connected to the number of sheets to form the number of composite plies around an edge of the base, wherein as the plate is lowered, the number of sheets is progressively pulled from between each of the number of composite plies.

2. The method of claim 1 further comprising:
drawing a vacuum on the number of composite plies and the number of sheets.

3. The method of claim 2, wherein lowering the plate connected to the number of sheets is performed while the number of composite plies and the number of sheets is under the vacuum.

4. The method of claim 2, wherein drawing the vacuum on the number of composite plies and the number of sheets comprises pulling a vacuum under the drape.

5. The method of claim 1, wherein lowering the plate connected to the number of sheets pulls the portions of the number of sheets from between each of the number of composite plies.

6. The method of claim 1 further comprising:
placing the number of composite plies on a base having a cavity, wherein the plate is associated with the cavity, and wherein lowering the plate connected to the number of sheets forms the number of composite plies to the base.

7. The method of claim 6, wherein forming the number of composite plies to the base includes forming a portion of the number of composite plies to the base within the cavity.

8. The method of claim 1 further comprising:
heating the number of composite plies to a forming temperature prior to lowering the plate.

9. A method comprising:
placing a first ply onto a base, the base having a number of cavities, wherein the first ply overlaps onto a plate;
placing a portion of a first sheet onto the first ply;
placing a second ply onto the first ply;
connecting the first sheet to the plate;
placing a drape directly over the first ply, the second ply, and the first sheet;
drawing a vacuum under the drape; and
lowering the plate, wherein the first sheet moves as the plate is lowered.

10. The method of claim 9, wherein lowering the plate connected to the first sheet pulls the portion of the first sheet from between the first ply and the second ply.

11. The method of claim 10, wherein lowering the plate forms the first sheet against the plate.

12. The method of claim 10, wherein lowering the plate connected to the first sheet forms the first ply and the second ply to the base.

13. The method of claim 12, wherein forming the first ply and the second ply to the base includes forming a portion of the first ply and a portion of the second ply to an edge of the base associated with a cavity of the number of cavities.

14. The method of claim 9 further comprising:
heating the first ply and the second ply to a forming temperature prior to lowering the plate.

15. A method comprising:
laying up a plurality of composite plies onto a base and a plate, wherein:
the plate is configured to move in a cavity;
the plurality of composite plies overlaps the plate;
the plate is disposed laterally adjacent the base;
the plurality of composite plies and a plurality of sheets are interleaved along a periphery of the base; and
the plurality of sheets is connected to the plate;
placing a drape over the plurality of composite plies and the plurality of sheets; and
lowering the plate in the cavity to form the plurality of composite plies around an edge of the base;
wherein, the plurality of composite plies and the plurality of sheets have:
a first respective configuration prior to lowering the plate;
a second respective configuration during lowering of the plate, the second respective configuration including the plurality of sheets bent away from the plate, the second respective configuration different than the first respective configuration; and
a third respective configuration after lowering the plate, the third respective configuration different than the second respective configuration, and the third respective configuration different than the first respective configuration.

16. The method of claim 15, wherein, prior to lowering the plate, the plurality of composite plies and the plurality of sheets form an overlap in the periphery.

17. The method of claim 16, wherein, after lowering the plate, the plurality of composite plies and the plurality of sheets are not overlapped.

18. The method of claim 15, wherein the first respective configuration includes the plurality of composite plies and the plurality of sheets being substantially flat.

19. The method of claim 18, wherein the second respective configuration further includes the plurality of composite plies bent toward the plate.

20. The method of claim 19, wherein the third respective configuration includes:
the plurality of composite plies bent around an edge of the base and toward the plate; and
the plurality of sheets being substantially flat.

* * * * *